United States Patent
Rawlins et al.

(10) Patent No.: US 8,432,949 B2
(45) Date of Patent: Apr. 30, 2013

(54) HIGH-POWER, HIGH-THROUGHPUT MICROWAVE DISCHARGE SINGLET OXYGEN GENERATOR FOR ADVANCED ELECTRICAL OXYGEN-IODINE LASERS

(75) Inventors: W. Terry Rawlins, Reading, MA (US);
David B. Oakes, Reading, MA (US);
Seonkyung Lee, Boston, MA (US);
Steven J. Davis, Londonderry, NH (US)

(73) Assignee: Physical Sciences Inc., Andover, MA (US)

( * ) Notice: Subject to any disclaimer, the term of this patent is extended or adjusted under 35 U.S.C. 154(b) by 273 days.

(21) Appl. No.: 12/881,987

(22) Filed: Sep. 14, 2010

(65) Prior Publication Data

US 2011/0170571 A1 Jul. 14, 2011

Related U.S. Application Data

(63) Continuation of application No. 12/018,162, filed on Jan. 22, 2008, now Pat. No. 7,817,699.

(60) Provisional application No. 60/881,750, filed on Jan. 22, 2007.

(51) Int. Cl.
*H01S 3/22* (2006.01)

(52) U.S. Cl.
USPC .................. 372/58; 372/55; 372/60; 372/76

(58) Field of Classification Search .................. 372/55, 372/58, 60
See application file for complete search history.

(56) References Cited

U.S. PATENT DOCUMENTS 6,501,780 B2 * 12/2002 Carroll et al. .................. 372/55
7,274,724 B2 9/2007 Carroll et al.

OTHER PUBLICATIONS

A. D. Palla, et al., "ElectricOIL Discharge and Post-Discharge Kinetics Experiments and Modeling" Proc. SPIE, vol. 6454, pp. 645401-1 to 645401-12 (2007).

D. L. Carroll et al., "Continuous-Wave Laser Oscillation on the 1315 nm Transition of Atomic Iodine Pumped by $O2(a^1\Delta)$ Produced in an Electric Discharge," Applied Physics Letters, vol. 86, pp. 111104 to 1111104-3 (2005).

D. L. Carroll et al., "Measurement of Positive Gain on the 1315 nm Transition of Atomic Iodine Pumped by $O2(a^1\Delta)$ Produced in an Electric Discharge," Applied Physics Letter vol. 85, No. 8, pp. 1320 to 1322 (2004).

D. L. Carroll et al., "Path to the Measurement of Positive Gain on the 1315-nm Transition of Atomic Iodine Pumped by $02(a1\Delta)$ Produced in an Electric Discharge," IEEE Journal Quantum Electronics, vol. 41, No. 2, pp. 213 to 223 (2005).

(Continued)

*Primary Examiner* — Dung Nguyen
(74) *Attorney, Agent, or Firm* — Proskauer Rose LLP

(57) ABSTRACT

A laser device includes an optical resonator, a microwave driven discharge device, and a source for a second gas. The microwave driven discharge device is disposed relative to the optical resonator. The microwave driven discharge device operates at a discharge power and gas flow rate to produce a selected amount of energetic singlet oxygen metastables flowing in the direction of the optical resonator. The second source for the second gas is disposed between the optical resonator and the microwave driven discharge device. The second gas reacts with the selected amount of energetic singlet oxygen metastables to form an excited species in an amount sufficient to support lasing of the excited species in the optical resonator.

21 Claims, 17 Drawing Sheets

OTHER PUBLICATIONS

D.L. Carroll et al., "Studies of CW Laser Oscillation on the 1315-nm Transition of Atomic Iodine Pumped by $O2(a^1\Delta)$ Produced in an Electric Discharge", IEEE Journal Quantum Electronics, vol. 41, No. 10, pp. 1309 to 1318 (2005).

D.S. Stafford et al., "$O2(^1\Delta)$ Production in He/O2 Mixtures in Flowing Low Pressure Plasmas," Journal of Applied Physics, vol. 96, No. 5, pp. 2451 to 2465 (2004).

F. C. Fehsenfeld et al., "Microwave Discharge Cavities Operating at 2450 MHz," The Review of Scientific Instruments, vol. 36, No. 3, pp. 294 to 298 (1965).

F. Kaufman, "The Production of Atoms and Simple Free Radicals in Glow Discharges," Advances in Chemistry Series 80, pp. 29 to 47 (1969).

G. F. Benavides et al., "Hybrid ElectricOIL Discharge, Gain, and Power Enhancements," AIAA 2007-4623, pp. 1281 to 1291 (2007).

J. W. Zimmerman et al, "Important Kinetic Effects in the Hybrid ElectricOIL System", Proc. of SPIE, vol. 6261, pp. 62611R-1 to 62611R-12, (2006).

K. Tachibana et al., "Excitation of the O2 (a1Δg) State by Low Energy Electrons," J. Chem. Phys., vol. 75, No. 7, pp. 3315-3320 (1981).

L. S Frost., "Momentum-Transfer Cross Sections for Slow Electrons in He, Ar, Kr, and Xe from Transport Coefficients," Physical Review, vol. 136, No. 6A, pp. 1538 to 1545 (1969).

P.C. Cosby, "Electron-Impact Dissociation of Oxygen," J. Chem. Phys., vol. 98, No. 12, pp. 9560 to 9569 (1993).

R. N. Franklin, "The Role of $O_2(a^1\Delta_g)$ Metastables and Associative Detachment in Discharges in Oxygen," J. Phys. D: Appl. Phys., vol. 34, pp. 1834 to 1839 (2001).

S.A. Lawton, "Excitation of the $b^1\Sigma^+_g$, State of $O_2$ by Low Energy Electrons," J. Chem. Phys. 69, No. 3, pp. 1055-3320 (1978).

W. L. Morgan et al., "ELENDIF: A Time-Dependent Boltzmann Solver for Partially Ionized Plasmas," Computer Physics Communications, vol. 58, pp. 127 to 152 (1990).

W. T. Rawlins et al., "Advanced Diagnostics and Kinetics of Oxygen-Iodine Laser Systems," American Institute of Aeronautics and Astronautics Paper No. AIAA-20055299, pp. 1-17 (2005).

W. T. Rawlins et al, "Dynamics of Vibrationally Excited Ozone Formed by Three-Body Recombination. II. Kinetics and Mechanism," J. Chem. Phys., vol. 87, No. 9, 5209 to 5221 (1987).

W. T. Rawlins et al., "Observations of Gain on the $I(^2P_{frax;1;2} \rightarrow {}^2P_{frax;3;2})$ Transition by Energy Transfer from $O_2(a^1\Delta_g)$ Generated by a Microwave Discharge in a Subsonic Flow Reactor," Applied Physics Letters, vol. 86, pp. 051105-1 to 051105-3 (2005).

W. T. Rawlins et al., "Production of Metastable Singlet Oxygen in the Reaction of Nitric Oxide with Active Oxygen," Proc. SPIE, vol. 6874, pp. 68740B-1 to 68740B-11, (2008).

W. T. Rawlins et al., "Spectroscopic Studies of a Prototype Electrically Pumped COIL System," SPIE, vol. 5334, Paper No. 12, pp. 88 to 98 (2004).

W. T. Rawlins et al., "Kinetics of Oxygen Discharges and I(2P ½) Excitation for EOIL," Proc. SPIE, vol. 6454, pp. 64540H-1 to 64540H-12, (2007).

W. T. Rawlins et al., "The Electric Oxygen-Iodine Laser: Chemical Kinetics of O2 (a1 Δ) Production and I(2P ½) Excitation in Microwave Discharge Systems," Proc. SPIE, vol. 6101, pp. 610011W-1 to 610011W-14 (2006).

M. Endo et al., "Output Power Enhancement by the Injection of Dissociated Iodine in Supersonic Chemical Oxygen-Iodine Laser", Proc. SPIE, vol. 3612, pp. 56-61 (Jan. 1999).

* cited by examiner

HIGH-POWER, HIGH-THROUGHPUT MICROWAVE DISCHARGE SINGLET OXYGEN GENERATOR FOR ADVANCED ELECTRICAL OXYGEN-IODINE LASERS

CROSS-REFERENCE TO RELATED APPLICATIONS

This application is a continuation of U.S. patent application Ser. No. 12/018,162 filed Jan. 22, 2008, which claims the benefit of and priority to U.S. Provisional Patent Application No. 60/881,750, filed Jan. 22, 2007, both of which are owned by the assignee of the instant application and the disclosures of which are incorporated herein by reference in their entireties.

GOVERNMENT RIGHTS

This invention was made with government support under Contract No. FA9451-04-M-0239, awarded by the United States Air Force. The government may have certain rights in the invention.

FIELD OF THE INVENTION

The invention relates generally to a method and apparatus for generating singlet oxygen in an enclosed container, and more particularly to a method and apparatus for efficiently generating energetic singlet oxygen metastables, at a high discharge power and in a high-throughput gas flow, e.g., for use in Electrical Oxygen-Iodine Laser (EOIL) systems.

BACKGROUND OF THE INVENTION

The Electric Oxygen-Iodine Laser (EOIL) is an emerging concept for a compact, closed-cycle, all-gas-phase, energy transfer laser with high-power military and industrial applications. The EOIL uses an electric discharge of a flowing oxygen gas mixture to generate singlet oxygen metastables, $O_2(a^1\Delta_g)$, and atomic oxygen, which subsequently react with molecular iodine to excite the atomic iodine lasing transition, $I(^2P_{1/2} \to ^2P_{3/2})$, at 1.315 µm. The viability of EOIL has been recently demonstrated through measurements of positive gain and lasing in low-power laboratory systems. The $I(^2P_{1/2})$ (or I*) excitation mechanism in EOIL is similar to that for the Chemical Iodine Oxygen Laser (COIL), except that dissociation of the reagent iodine, $I_2$, occurs through rapid reactions with atomic oxygen rather than the much less efficient energy transfer from $O_2(a)$. COIL systems use an aqueous chemical process to generate $O_2(a)$, therefore no atomic oxygen is present, and $I_2$ is dissociated by a complex multi-step process which consumes a portion of the $O_2(a)$.

SUMMARY OF THE INVENTION

The invention, in one embodiment, features an efficient technique to generate energetic singlet oxygen metastables, $O_2(a^1\Delta)$ at high discharge power and in a high-throughput gas flow using a microwave driven discharge device. In one embodiment, the device is a Microwave Driven Jet (MIDJet) (e.g., as available from Physical Sciences Inc. in Andover, Mass.). The energetic singlet oxygen metastables can be used in EOIL systems.

EOIL's gas-phase electric discharge generation of the active oxygen species offers substantial improvements in efficiency and weight limitations of atomic iodine laser systems. EOIL technology is compatible with non-hazardous, liquid-free chemical requirements, on-board power generation, turn-key operation, substantial weight reduction, and closed-cycle systems. These properties are essential for many advanced Department of Defense applications, including ground based, airborne and space deployment. A microwave driven discharge device (e.g., a MIDJet singlet oxygen generator) is an attractive and complementary alternative to other EOIL techniques currently being pursued, e.g., rf discharge and pulser-sustainer methods, because of its inherent capability for high input power, high electrical efficiency, and high mass flow rate, all of which can increase the output of EOIL laser devices. Furthermore, commercially available magnetrons can be used to reduce cost and increase reliability. Using a microwave driven discharge device, an EOIL system can operate at a discharge power of 1 kW or higher (e.g., in the 0.1-1 MW range).

In one aspect, the invention features a laser device including an optical resonator, a microwave driven discharge device, and a source for a second gas. The microwave driven discharge device is disposed relative to the optical resonator. The microwave driven discharge device operates at a discharge power and gas flow rate to produce a selected amount of energetic singlet oxygen metastables flowing in the direction of the optical resonator. The second source for the second gas is disposed between the optical resonator and the microwave driven discharge device. The second gas reacts with the selected amount of energetic singlet oxygen metastables to form an excited species in an amount sufficient to support lasing of the excited species in the optical resonator.

In another aspect, the invention features a method for providing laser output. A flow of ground state oxygen and a substantially inert gas is directed into a microwave cavity to produce energetic singlet oxygen metastables. Discharge power and gas flow rate are optimized to produce a selected amount of the energetic singlet oxygen metastables. A flow of a third gas is directed to react with the selected amount of the energetic singlet oxygen metastables to form an excited species in an amount sufficient to support lasing of the excited species in an optical resonator disposed relative to the microwave cavity.

In another aspect, the invention features a laser device including means for directing a flow of ground state oxygen and a substantially inert gas into a microwave cavity to produce energetic singlet oxygen metastables. The laser device includes means for optimizing discharge power and gas flow rate to produce a selected amount of the energetic singlet oxygen metastables. The laser device includes means for directing a flow of a third gas to react with the selected amount of the energetic singlet oxygen metastables to form an excited species in an amount sufficient to support lasing of the excited species in an optical resonator disposed relative to the microwave cavity.

In further examples, any of the aspects above, or the embodiments described herein, can include one or more of the following features.

In some embodiments, the microwave driven discharge device comprises a microwave cavity, an injector directing a flow of ground state oxygen and a substantially inert gas to the microwave cavity, and a microwave power source supplying the discharge power directly to the microwave cavity to form a plasma discharge flowing through an output nozzle of the microwave cavity. The plasma discharge can include the selected amount of energetic singlet oxygen metastables.

The discharge power and the gas flow rate can be selected to increase the selected amount of energetic singlet oxygen metastables while controlling electron temperature in the microwave cavity.

The discharge power and the gas flow rate can be selected to increase the selected amount of energetic singlet oxygen metastables while controlling gas temperature in the microwave cavity.

The injector can direct a flow of NO with the ground state oxygen and the substantially inert gas to the microwave cavity. The microwave cavity can be cooled with water.

The nozzle can be disposed between the optical resonator and the source. The nozzle can effect a supersonic expansion of the gas flow including the excited species into the optical resonator. The optical resonator can be disposed in a subsonic flow region of the laser device. The laser device can be an open system or a closed system.

The microwave driven discharge device can include or can be a MIDJet generator. In some embodiments, the microwave driven discharge device includes a plurality of MIDJet generators disposed relative to the optical resonator to increase the power of the laser output.

The microwave power source can deliver about 1 kW to about 100 kW. The pressure in the microwave cavity can be less than 100 torr. The output nozzle diameter can be less than 30 mm.

Using a MIDJet 1-5 kW system operating on flowing $O_2$/He gas mixtures at 1-2 kW and reduced pressures (e.g., about 30-70 torr) in the cavity, a non-equilibrium discharge plasma can be produced with concomitant high yields of $O_2(a)$ in the effluent flow. Orifice diameters can be less than about 15 mm when operating at a frequency of 2450 MHz. Orifice diameters can be less than about 30 mm when operating at a frequency of 915 MHz. Additionally, $O_2(a)$ yields can increase markedly with decreasing $O_2$ mole fraction in the He diluents, as well as with the decreased discharge pressure.

The $O_2(a)$ yields can exceed 15% for $O_2$ mole fractions less than 0.2, and 36% for 2% $O_2$. For example, the $O_2(a)$ molar flow rate can be approximately 1 mmole/s at 20% $O_2$, although larger flow rates can be achieved depending on the application. A wall-plug efficiency of between 10-30% can be achieved, although larger or smaller efficiencies can be achieved depending on the application. The power available for lasing can be in the 30-50 W range, although higher and lower laser powers can be achieved, for these flow conditions. The temperature in the supersonic laser cavity can be between about 100-250 K. Thus, MIDJet-generated $O_2(a)$ yields and flow rates are capable of producing atomic iodine population inversions and lasing with a properly designed supersonic reacting flow system at discharge powers up to 1 MW.

BRIEF DESCRIPTION OF THE DRAWINGS

The advantages of the invention described above, together with further advantages, can be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
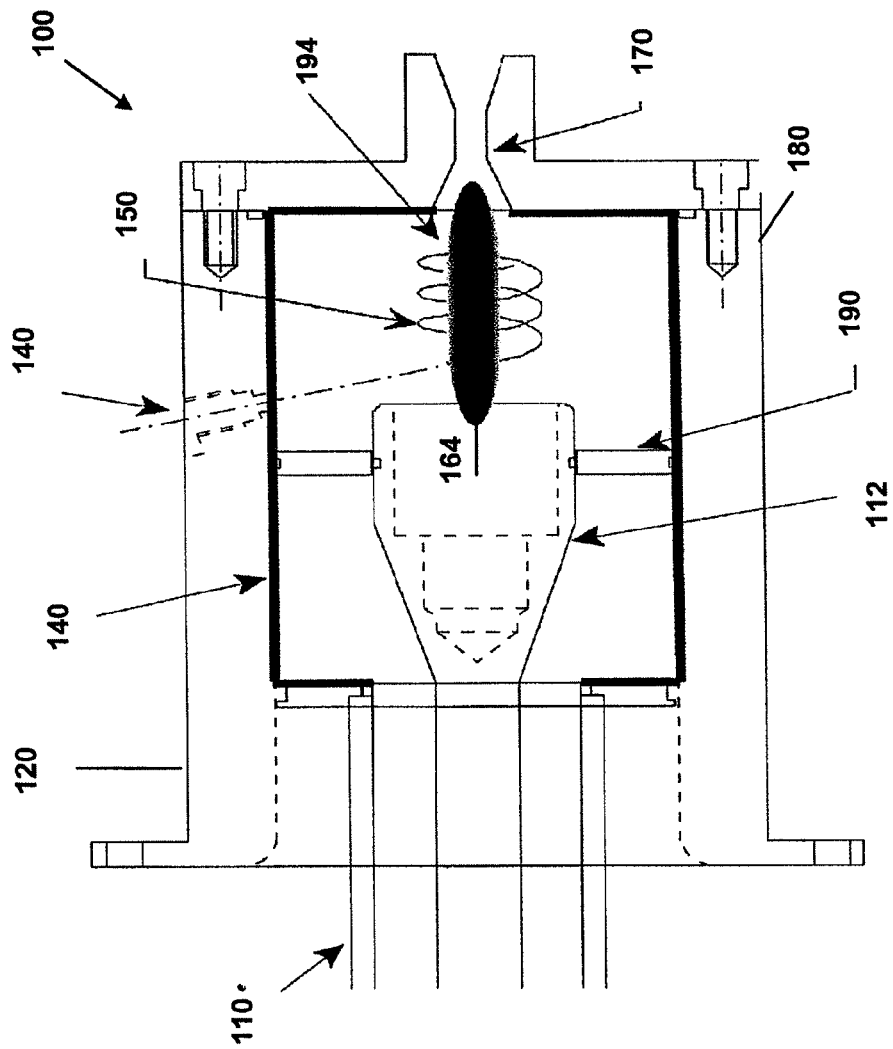
FIG. 1 is a cross sectional view of one embodiment of a microwave driven discharge device.

FIG. 1 is a cross sectional view of one embodiment of a microwave driven discharge device 100 for providing energetic molecular species. In certain embodiments, the microwave driven discharge device 100 can be a MIDJet singlet oxygen metastable generator. An exemplary microwave driven discharge device is described in U.S. Pat. No. 5,793,013 to Read et al., the entire disclosure of which is herein incorporated by reference in its entirety. The microwave driven discharge device 100 includes an input waveguide 110, a microwave launcher 120, and a microwave cavity 130. The microwave cavity 130 includes inner microwave cavity conductor portion 112, a gas inlet nozzle 140, an output nozzle 170, a housing 180, and a microwave passing window 190. The microwave cavity 130 confines plasma 194 without the use of a discharge tube.

The input waveguide 110 of the microwave cavity 130 is movable along a longitudinal axis 164, allowing for the length of the microwave cavity 130 to be adjusted. Adjusting the length of the microwave cavity 130 achieves resonance in a particular mode of operation, such as a $TM_{01}$ mode. The $TM_{01}$ mode has an axial electric field maximum at the ends of the microwave cavity 130 that is desirable for concentrating power near the output nozzle 170.

In some embodiments, the housing 180 is actively cooled (e.g., with water). In one embodiment, the housing 180 can be brass and the interior surfaces forming the microwave cavity 130 can be gold-flashed brass, although other metallic materials can be used.

The gas inlet nozzle 140 can be used to introduce a gas suitable for ionization into the microwave cavity 130 and for creating a velocity and swirl adequate to stabilize a discharge plasma in all orientations within the microwave cavity 130. More than one gas inlet nozzle 140 can be used. The gas inlet nozzle 140 is preferably disposed at an angle of about 25 degrees to 70 degrees with respect to the longitudinal axis 164 of the microwave cavity 130. The angle of orientation of the gas inlet nozzle 140 along with the velocity at which the gas is introduced and the pressure within the microwave cavity 130 control the vorticity of the gas within the microwave cavity 130. A specific vorticity within the microwave cavity 130 can be chosen to compensate for centripetal forces experienced by the gas. In one embodiment, the gas inlet nozzle 140 can take the form of a converging or diverging nozzle. A converging nozzle can increase the velocity of the gas and cause impingement of the gas against the interior surfaces of the microwave cavity 130.

In some embodiments, the output nozzle 170 can have a profile corresponding to either a conical, a quasi-parabolic, a cylindrical, or a parabolic taper. In some embodiments, the output nozzle 170 is made of either metal, ceramic, graphite, or a mixture thereof to resist erosion from the materials utilized in spraying. In one embodiment, the output nozzle 170 can have an aperture with a diameter in the range of about 0.5 mm to 50 mm. In an embodiment where the microwave driven discharge device operates at 2450 MHz, the aperture diameter can be in the range of about 1 mm to 15 mm (e.g., about 10 mm). In an embodiment where the microwave driven discharge device operates at 915 MHz, the aperture diameter can be in the range of about 15 mm to 30 mm (e.g., about 20 mm). In some embodiments, the output nozzle 170 can have a variable aperture for controlling output gas velocity or cavity pressure.

The microwave passing window 190 can be formed of a material substantially transparent to microwave radiation. The microwave passing window 190 is a pressure plate for maintaining a certain pressure in the microwave cavity 130. The microwave passing window 190 can be of varying thickness. In one embodiment, the microwave passing window 190 can be of a thickness in a range of 6 mm to 12 mm, e.g., a thickness that is crack-resistant to pressures in a range of 0 psig to 150 psig.

The microwave launcher 120 includes an input waveguide 110. The input waveguide 110 can be a coaxial launcher with an inner microwave cavity conductor portion 112 and an outer microwave cavity conductor portion 114. An end of the inner microwave cavity conductor portion 112 extends through the microwave passing window 190. The microwave cavity 130 can support a transverse electromagnetic mode to generate a more efficient and uniform spray. In one embodiment, the input waveguide 110 can discharge at frequency 2450 MHz. In one embodiment, the input waveguide 110 can discharge at frequency 915 MHz. In one embodiment, the input waveguide 110 can discharge at a power of 40-120 W, the discharge power that is suitable for room temperature discharge-flow experiments.

In some embodiments, the discharge power of the input waveguide 110 and the gas flow rate in the microwave cavity 130 can be controlled so that a selected amount of energetic singlet oxygen metastables is generated. Increasing the discharge power can create an undesirable increase in temperature of the electrons and/or gas inside the microwave cavity 130. The gas flow rate can be adjusted to control the temperature increase in the electrons and/or gas. For example, to increase the amount of energetic singlet oxygen metastables, the discharge power and/or gas flow rate can be increased.

Figure 2:
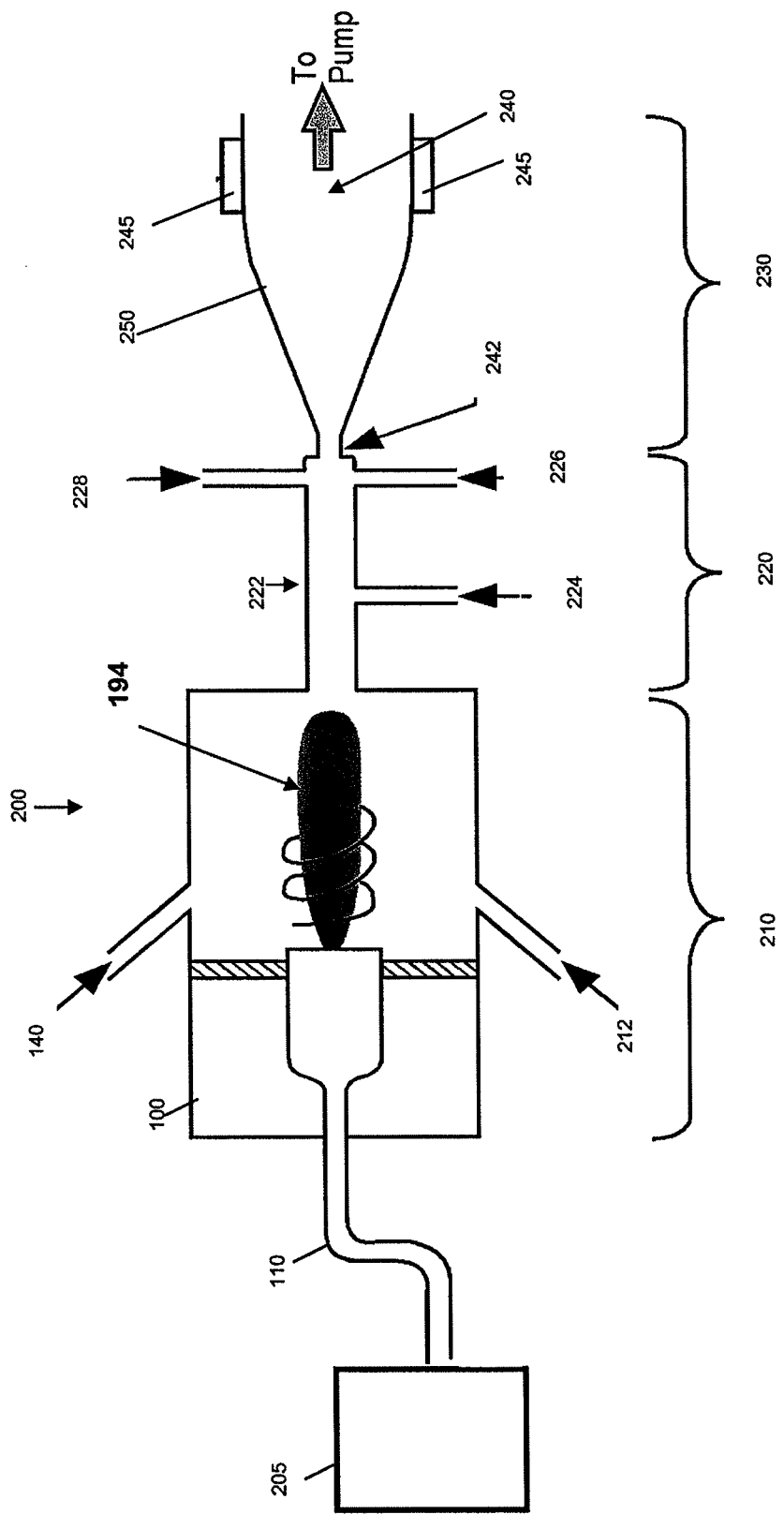
FIG. 2 is a cross sectional view of one embodiment of an EOIL, including microwave driven discharge device for providing singlet oxygen metastables.

FIG. 2 is a cross sectional view of one embodiment of an apparatus 200 including an EOIL and a microwave driven discharge device for providing singlet oxygen metastables. The apparatus 200 includes microwave driven discharge device region 210, a subsonic flow section 220, and a supersonic flow section 230.

The microwave driven discharge device region 210 includes a microwave driven discharge device 100, an input waveguide 110, and a microwave power supply 205. The microwave driven discharge device 100 includes a first gas inlet nozzle 140 and a second gas inlet nozzle 212. The microwave power supply can be a magnetron, which provides power to the input waveguide 110. In one embodiment, the microwave power supply 205 can be a commercially available magnetron. Magnetrons are electrically efficient and available for high power operation in the range of 1 kW to 100 kW.

The input waveguide 110 supplies an electrical microwave discharge to a flowing oxygen and inert gas mixture that is injected into the microwave cavity 130 through the gas inlet nozzles 140 and 212. The electrical microwave discharge to the flowing and inert gas mixture generates singlet oxygen metastables and atomic oxygen in the plasma 194. The singlet oxygen metastables and atomic oxygen are received by the subsonic flow section 220. The subsonic flow section 220 includes a subsonic flow cavity 222, three gas inlet nozzles 224, 226 and 228, and a nozzle 232. The gas inlet nozzles 224 can be used to introduce a buffer gas, such as $NO_2$. The gas inlet nozzles 226 and 228 inject molecular iodine into the subsonic flow section 220. In some embodiments, the subsonic flow cavity 222 has a short section, allowing for a 1 inch axisymmetric flow of the singlet oxygen metastables and atomic iodine. The short section can merge to a water cooled transition section that transforms the flow into a rectangular duct approximately 1 cm×5 cm. The nozzle 232 can be 1.5 mm to produce Mach 2.6 flow.

The supersonic flow section 230 receives expanding gas from the nozzle 232 of the subsonic flow section 220. The supersonic flow section 230 includes an optical resonator region 240 including a pair of windows 245. In some embodiments, the windows 245 can be the end mirrors of the optical resonator. The supersonic flow section 230 includes a flow tube 250 in communication with a pump (e.g., an open system). In some embodiments, the apparatus 200 is pumped through a high-conductance gate valve and foreline by a 2150 cfm (air) blower and forepump combination.

In some embodiments, the flow in the supersonic flow section 230 can diverge with a half-angle of 2 or 4 degrees. The angle of divergence can be sufficient to offset boundary layer growth. Additionally, the distance from the nozzle 232 to the end of the supersonic flow section 230 can be 12 cm. In some embodiments, the supersonic flow section 230 is aluminum and internally coated with Teflon to mitigate $O_2(a)$ wall losses.

The mechanism for the reactions between molecular iodine and the singlet oxygen metastables and atomic oxygen is:

| | | |
|---|---|---|
| $O + I_2 \rightarrow IO + I$ | $I_2$ dissociation part 1 | EQN. 1 |
| $O + IO \rightarrow O_2 + I$ | $I_2$ dissociation part 2 | EQN. 2 |
| $O_2(a) + I \leftrightarrow O_2(X) + I^*$ | $I^*$ excitation | EQN. 3 |
| $O + I^* \rightarrow O + I$ | $I^*$ quenching | EQN. 4 |

The two dissociation reactions shown by EQN. 1 and EQN. 2 have near gas-kinetic rate coefficients, and rapidly react in less time then the time it takes for reagent mixing to produce complete dissociation if [O]>2[I₂]. In some embodiments, I can be generated by predissociating I₂. In some embodiments, I can be formed from a iodine containing compound.

The I* excitation by the energy transfer from O₂(a) is near-resonant and reversible, as shown in EQN 3. The forward ($k_f$) and reverse ($k_r$) rate coefficients stand in the ratio of a temperature-dependent equilibrium constant:

$$k_f/k_r = K_{eq}(T) = 0.75 \exp(402/T) \qquad \text{EQN. 5}$$

Quenching of I* by O, shown by EQN. 4, can result in a significant loss of I*, and thereby in O₂(a), for typical discharge-generated O concentrations. Titrations with NO₂ and/or NO can ensure that [O] is large enough to dissociate I₂, but small enough to minimize I* quenching. The gas inlet nozzle 224 can inject nitrogen dioxide, NO₂, into the subsonic flow section 220, to control the O concentration through titrations with the NO₂. In one embodiment, the gas inlet nozzle 224 can inject NO, into the subsonic flow section 220 to minimize the I* quenching. In some embodiments, NO can be introduced to the microwave discharge along with oxygen and an inert gas.

$$O + NO + M \rightarrow NO_2 + M \qquad \text{EQN. 6}$$

$$O + NO_2 \rightarrow NO + O_2 \qquad \text{EQN. 7}$$

The I* excitation mechanism results in a rate law of the form:

$$d[I^*]/dt = k_f[O_2(a)][I] - k_r[I^*][O_2(X)] - k_O[I^*][O] \qquad \text{EQN. 8}$$

where the net effect of I* quenching is to convert O₂(a) to O₂(X) as the reaction time increases. For slow quenching, a quasi-steady state approximation for [I*] gives:

$$[I^*]/[I] \cong k_f[O_2(a)]/\{k_r[O_2(X)] + k_O[O]\} \qquad \text{EQN. 9}$$

As $k_O[O]$ decreases through reduction of [O], $k_O[O] < k_r[O_2(X)]$, the expression approaches a true steady-state relationship given by:

$$[I^*]/[I] \cong k_f[O_2(a)]/k_r[O_2(X)] = K_{eq}(T)[O_2(a)]/[O_2(X)] \qquad \text{EQN. 10}$$

EQN. 10 defines the maximum [I*]/[I] ratio that can be achieved for a given [O2(a)]/[O2(X)] and temperature. Through consideration of atomic iodine state dynamics and degeneracies, it can be shown that population inversion and positive gain are achieved if [I*]/[I] is greater than 0.5. The apparatus 200 can be driven with an input power of 0.07 kW to 0.1 kW such that a positive I*→I gain in the subsonic flow section 220 for a temperature of 350 K as shown in "Observations of Gain on the I(2P1/2→2P3/2) Transition by Energy Transfer from O2(a1Δg) Generated by a Microwave Discharge in a Subsonic Flow Reactor," by W. T. Rawlins, S. Lee, W. J. Kessler, and S. J. Davis, Appl. Phys. Lett. 86, 051105 (2005), which is incorporated herein by reference in its entirety. EQN. 10 can be used to define a minimum [O2(a)]/[O2(X)] ratio required to achieve gain.

The total O₂, [O₂]ₒ, introduced into the apparatus 200, is given by:

$$[O_2]_o = [O_2(X)] + [O_2(a)] + [O]/2 \qquad \text{EQN. 11}$$

The ratio [O₂(a)]/[O₂]ₒ is defined as the yield of O₂(a), $Y_A$, produced by the discharge and is a fundamental metric for the performance of the apparatus 200. The combination of EQN. 10 and EQN. 11 defines a minimum O₂(a) yield, $Y_A$, that must be exceeded in order to produce a positive gain, in the limit of negligible [O]. For a supersonically cooled flow of approximately 200 K, a yield of O₂(a), $Y_A$, greater than 8.2% is required to achieve gain. The apparatus 200 supplied with an input power in the 0.1 kW to 1.0 kW range exhibits O₂(a) yields, $Y_A$, in the 20-35% range for dilute O₂/rare-gas mixtures, well above the required threshold even at room temperature.

The total O₂(a) power produced by the EOIL discharge is the product of the O₂(a) molar flow rate and energy shown by:

$$P_A = F_{O_2} Y_A E_A \qquad \text{EQN. 12}$$

where $F_{O_2}$ is the molar flow rate of O₂, $Y_A$ is the O₂(a) yield, and $E_A$ is O₂(a) energy, 94.369 kJ/mole. An alternative metric, which requires specification of the laser cavity temperature, is the O₂(a) power available above the gain threshold:

$$P_{A,avail} = F_{O_2}(Y_A - Y_o(T))E_A = P_A(1 - Y_o(T)/Y_A) \qquad \text{EQN. 13}$$

where $Y_o(T)$ is the threshold O₂(a) yield as given by EQN. 10 and 11. The available power is the theoretical maximum that can be extracted as laser power if there are no losses in the system.

Typically, $Y_o(T)$ is greatly reduced by supersonic expansion in the supersonic flow section 230 so the available power for laser output from the optical resonator 240 increases with decreasing cavity temperature. Limitations of reagent mixing, reaction kinetics, and optical losses can reduce the power extracted in a practical system. The total and available O₂(a) power can be important figures of merit in the evaluation of the performance of the apparatus 200. For example, the performance can scale as the product of the O₂(a) yield and the total oxygen flow rate. Both high O₂(a) yields and high oxygen flow rates can be used to scale laser powers into the kW range and higher. For example, if $Y_A$ is approximately equal to 25% and $Y_o(200 K)$ is approximately equal to 8%, then $P_{A,avail}$ is approximately equal to (⅔)$P_A$. An available laser power of 1 kW can require a total O₂(a) power of 1.5 kW and an oxygen flow rate, in rare gas diluents, of approximately 0.06 mole/s (80 l/min at STP).

Figure 3:
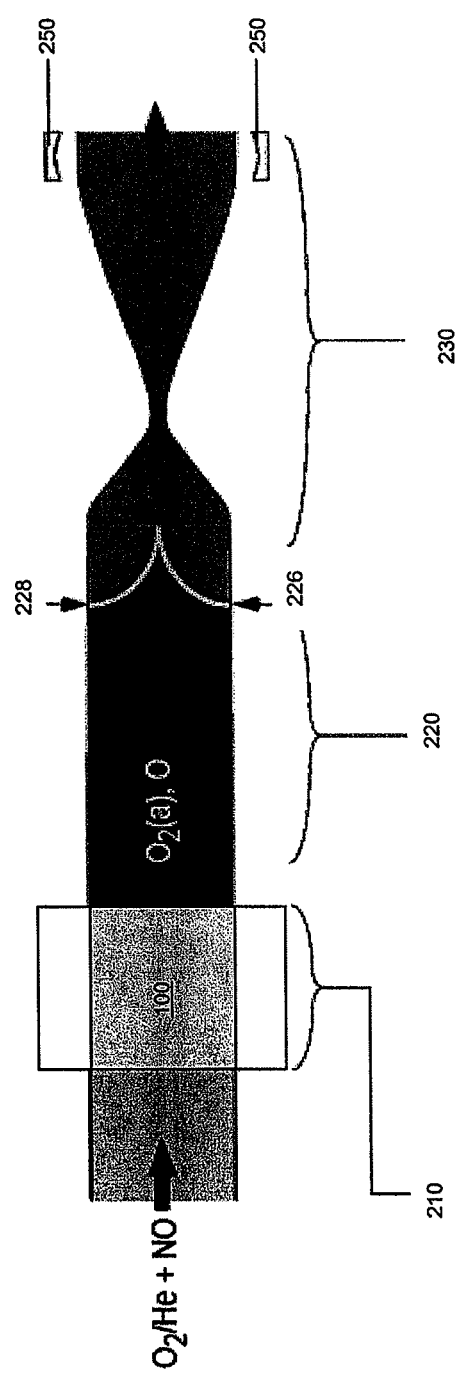
FIG. 3 is a schematic illustration of one embodiment of chemistry of an EOIL, including microwave driven discharge device for providing singlet oxygen metastables.

FIG. 3 shows chemistry of an EOIL apparatus. In some embodiments, NO is injected into the microwave driven discharge device 100 with oxygen and an inert gas. Helium is shown in FIG. 3, although other gases can be used. Adding NO can reduce the O+I* quenching effect and improve efficiency of the discharge. The NO flow rate can be optimized to produce maximum gain for a given I* flow rate. For example, the NO flow rate can be decreased with increasing I₂ flow rate. The NO flow rate can be in the range of about 0.4 to 0.5 mmole/s.

An optical resonator is positioned relative to the supersonic flow section 230. The optical resonator can include, for example, two mirrors 250. The mirrors can be 1 inch diameter and have a reflectivity of 99.9997%. Each mirror can be mounted on a three-point tilt control and set back approximately 6.5 inches from the side edge of the two dimensional supersonic flow field, on opposite sides of the flow. The mirrors can be centered approximately 4.35 cm downstream from the nozzle. In some embodiments, the I₂ can be injected into the subsonic flow section 220. The subsonic flow section 220 can be about 1 cm, 4 cm or 8 cm from the microwave driven discharge device section 210.

For a 5% O₂/He mixture at 47 mmole/s, NO approximately equal to 0.4 mmole/s through the microwave driven discharge device 100 at 33 torr, 24 torr in the subsonic flow section 220, 1 kW of discharge power, and I₂ heated in the range of 308 to 318 degrees Kelvin, laser output can be approximately 20 mW. The total singlet oxygen power in the flow can be about 41 W. For a discharge flow rate of 82 mmoles/s and 70 torr in the microwave driven discharge device section 210, laser output can be approximately 110 mW.

Figure 4:
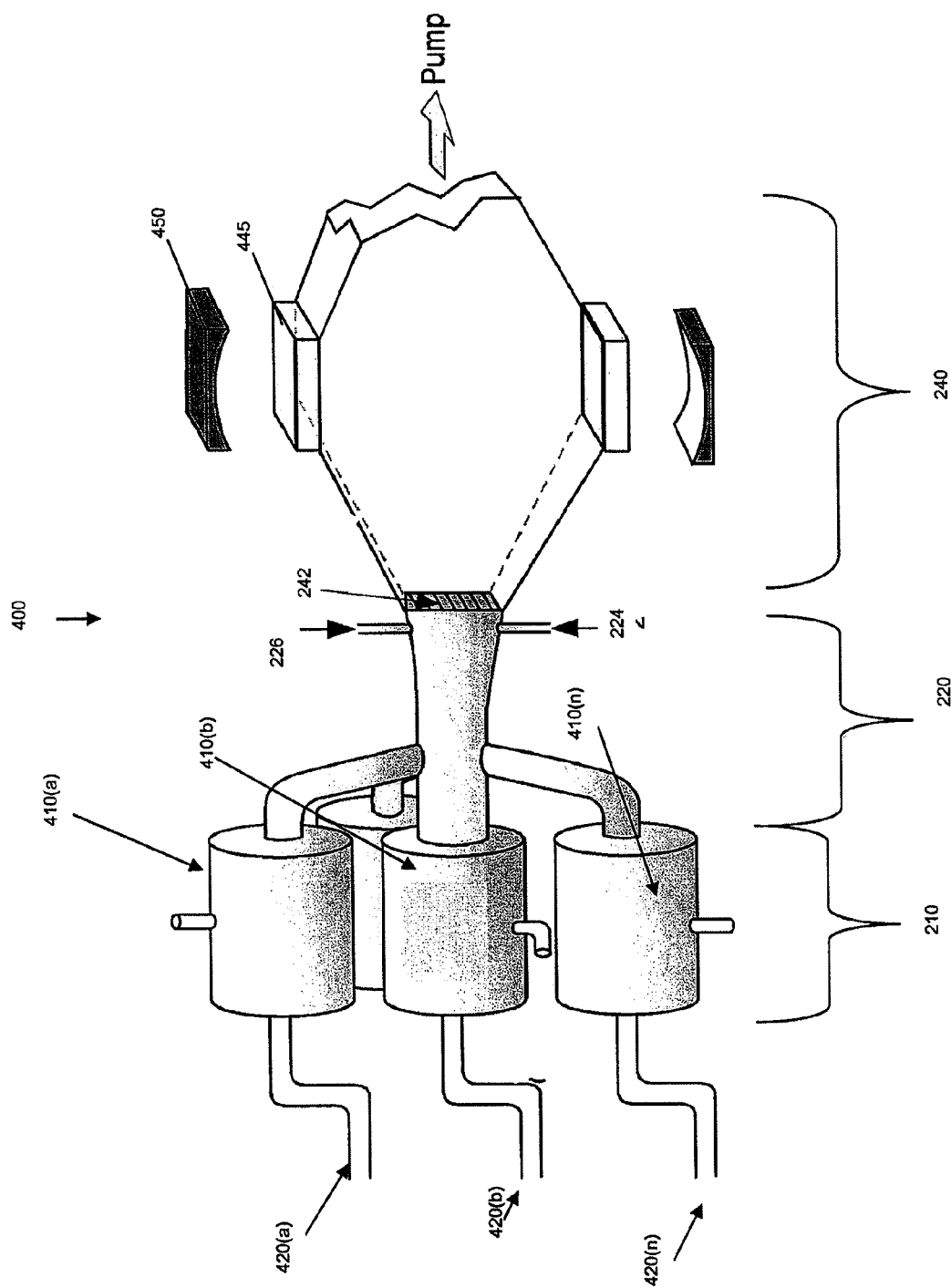
FIG. 4 is a diagram of one embodiment of a supersonic, high-power EOIL driven by multiple microwave driven discharge devices.

FIG. 4 shows an apparatus 400 including multiple microwave driven singlet oxygen metastable generators, 410a, 410b, . . . ,410n, generally generator 410. Each generator 410 includes, respectively, a waveguide, 420(a), 420(b), . . . 420(n), generally waveguide 420. Each generator 410 produces a singlet oxygen flow rate that is additive in the subsonic flow section 220. An increase in singlet oxygen can provide an increase in I* in the supersonic flow section 230, resulting in an increase in laser output power. Each generator 410 can be a MIDJet. The optical resonator includes windows 445 in communication with the flow tube, and mirrors 450 defining the ends of the optical resonator cavity.

Figure 5:
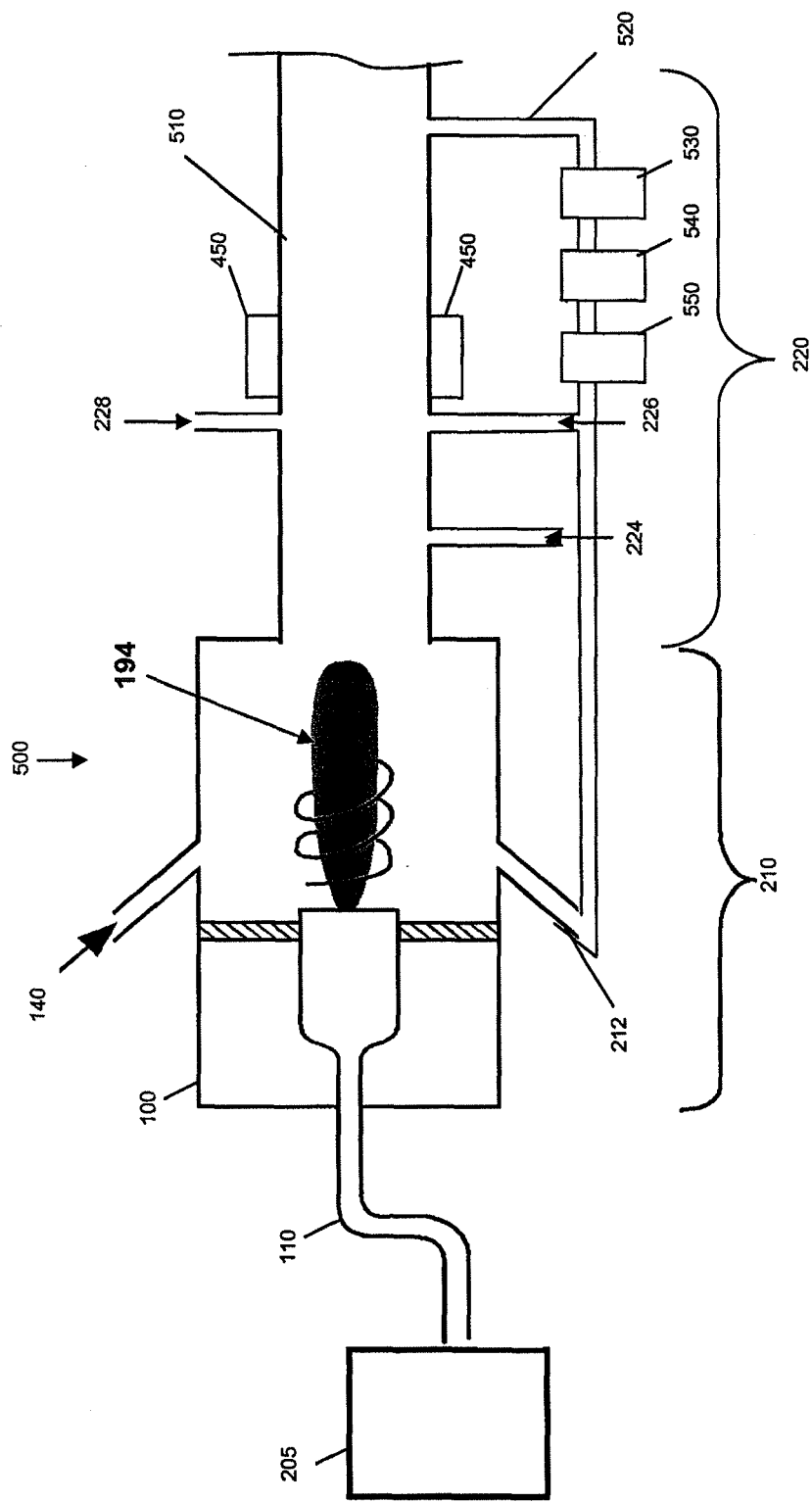
FIG. 5 is a cross sectional view of one embodiment of an EOIL, including microwave driven discharge device for providing singlet oxygen metastables.

FIG. 5 is a cross sectional view of one embodiment of an apparatus 500 including an EOIL and a microwave driven discharge device 100 for providing singlet oxygen metastables. The optical resonator, including mirrors 450, is disposed in the subsonic flow region 220 of the apparatus 500. Operating in the subsonic flow section 220 allows for operation at higher temperature than the supersonic region and correspondingly higher $O_2(a)$ concentrations.

The apparatus 500 can include an open pumping system or a closed pumping system. For example, in a closed system, apparatus 500 can include a gas regeneration system for recycling gas. Gas from the flow tube 510 can be recycled and re-introduced into the microwave driven discharge device 100 and/or the subsonic flow region 220 upstream from the optical resonator.

The gas regeneration system can include an outlet tube 520 from flow tube 510, a cold trap 530, a turbo pump 540, and a heat exchanger 550. Effluent gas from flow tube 510 can pass through one or more of cold trap 530, turbo pump 540, and heat exchanger 550. Cold trap 530 can trap iodine from the effluent gas. The trapped iodine can be reintroduced into inlet tube 226. Turbo pump 540 can raise the pressure of a gas being fed into the microwave driven discharge device 100. For example, oxygen, NO or the substantially inert gas can be reintroduced into gas inlet nozzle 140 or 212. Heat exchanger 550 can control the temperature of the recycled gas. For example, if the gas being reintroduced into the microwave driven discharge device 100 becomes heated beyond a predetermined temperature, the heat exchanger 550 can cool the gas before reintroducing the gas into gas inlet nozzle 140 or 212.

In some embodiments, each MIDJet singlet oxygen metastable generators can be supplied with 100 kW of power to drive an EOIL in the 10 kW class or greater. The ultimate efficiency at elevated power depends on a complex interplay of several factors such as the power to flow rate ratio, tradeoffs between $O_2(a)$ yield and oxygen flow rate, discharge ionization rate, discharge plenum temperature and pressure, supersonic expansion characteristics, O-atom effects, $I_2$ injection and mixing dynamics, and optical power extraction requirements. In addition, commercially available microwave power systems that operate at 30 kW to 100 kW and low frequencies, e.g., 915 MHz at 30 kW, to enable a large discharge volume, thus a larger diameter for the supersonic flow section 230 and a reduction in the power to flow rate ratio for a given plenum pressure.

$O_2(a)$ can be generated in a variety of electric discharges and configurations. In some embodiments, the microwave driven discharge device can be an electrodeless microwave discharge at 2450 MHz. In some embodiments, the microwave driven discharge device includes a microwave cavity that is an Evenson-type resonant cavity. The discharges can be at a power of about 40 to 120 W, and an $O_2/Ar$ or $O_2/He$ mixture can have a pressure of a few torr. The E/N range can be about 50 to 100 Td. In some embodiments, for high power and high throughput operation, the microwave cavity can have a pressure of 40 to 50 torr, the input waveguide can be a coaxial wire providing an input power of 1 kW, and an E/N of about 30 to 40 Td, high power and high throughput.

Figure 6:
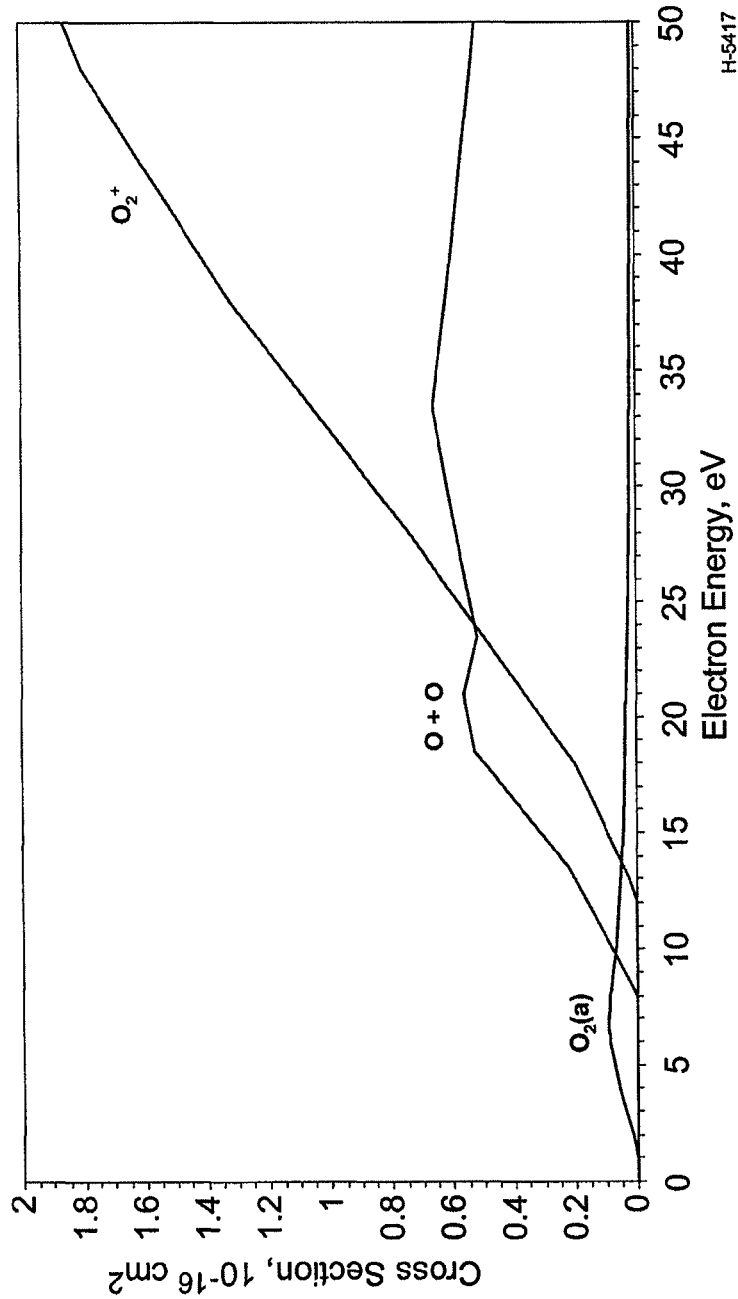
FIG. 6 is a graph of cross sections required for electron-impact excitation of $O_2(a)$ excitation, $O_2$ dissociation, and $O_2$ ionization.

FIG. 6 is a graph of electron energy distribution cross sections required for electron-impact excitation of $O_2$ to form $O_2(a)$ excitation, $O_2$ dissociation and $O_2$ ionization. The rate coefficient for each electron-impact excitation process can be modeled by the convolution integral of the energy-dependent excitation cross sections $\sigma(E)$ and the electron energy distribution $N(E)$:

$$k = \left(\frac{2e}{m}\right)^{1/2} \int_0^\infty \sigma(E)N(E)E\,dE \qquad \text{EQN. 14}$$

Cross sections for $O_2(a)$ excitation, $O_2$ dissociation, and $O_2$ ionization are shown in FIG. 4. Although $O_2(a)$ lies at an energy of approximately 1 eV, $O_2(a)$ excitation cross section peaks at 6 to 7 eV. In addition, electron energies greater than 12 eV are required to maintain ionization in the plasma. Thus, the electron energy distribution or "temperature" can be "hot" enough to provide sufficient overlap with these cross sections. An electron energy distribution which gives significant $O_2(a)$ excitation and ionization can also give substantial O-atom production.

Figure 7:
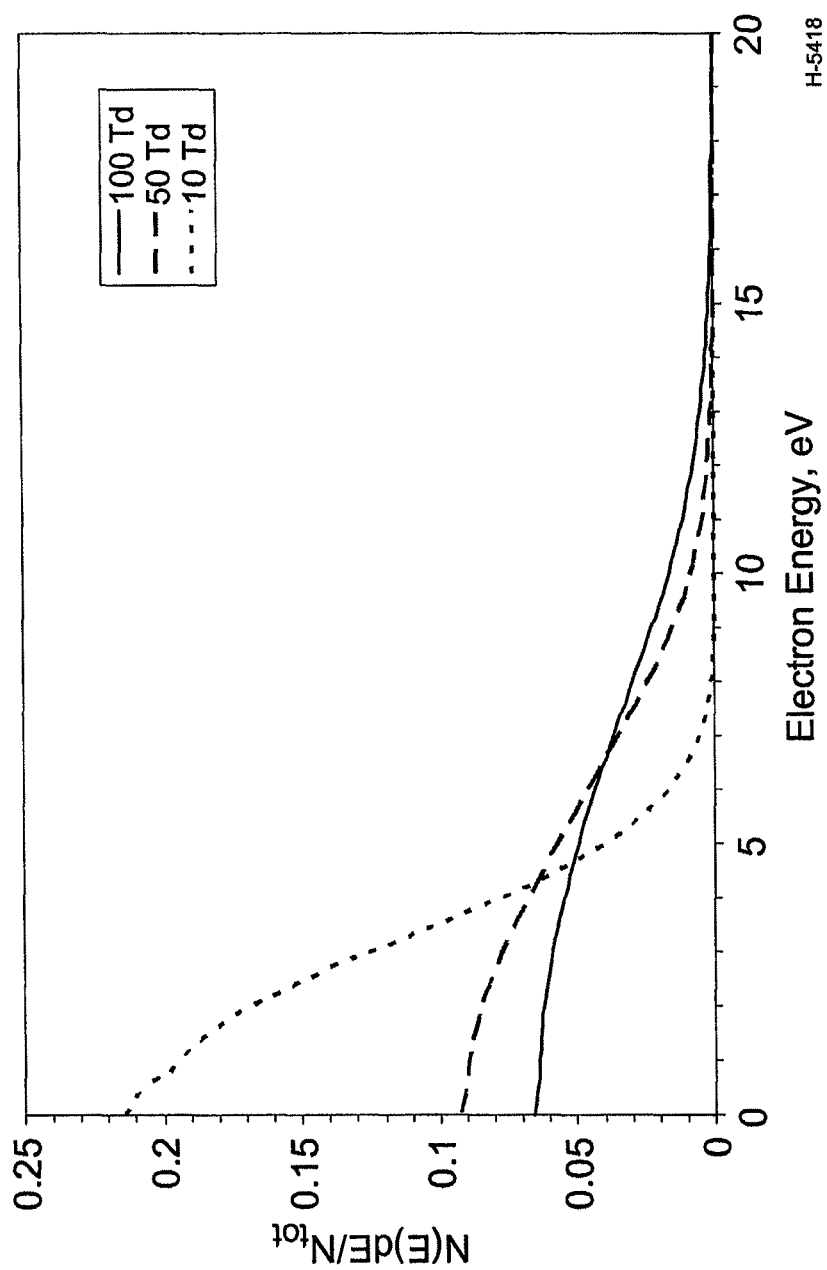
FIG. 7 is a graph of computed electron energy distributions functions for a discharge-excited $O_2$/Ar mixture having 10% $O_2$ in Ar.

FIG. 7 is a graph of computed electron energy distributions functions for a discharge-excited $O_2/Ar$ mixture having 10% $O_2$ in Ar. Two controls on the electron energy distribution are the E/N of the discharge and the relative amounts of $O_2$ and rare gas (e.g., He or Ar) in the gas mixture. E/N is the ratio of the field strength E, governed by the applied power and discharge geometry, to the total number density N, governed by pressure and temperature. With an increasing E/N, the fraction of high-energy electrons increases, signifying increasing electron "temperature."

Figure 8:
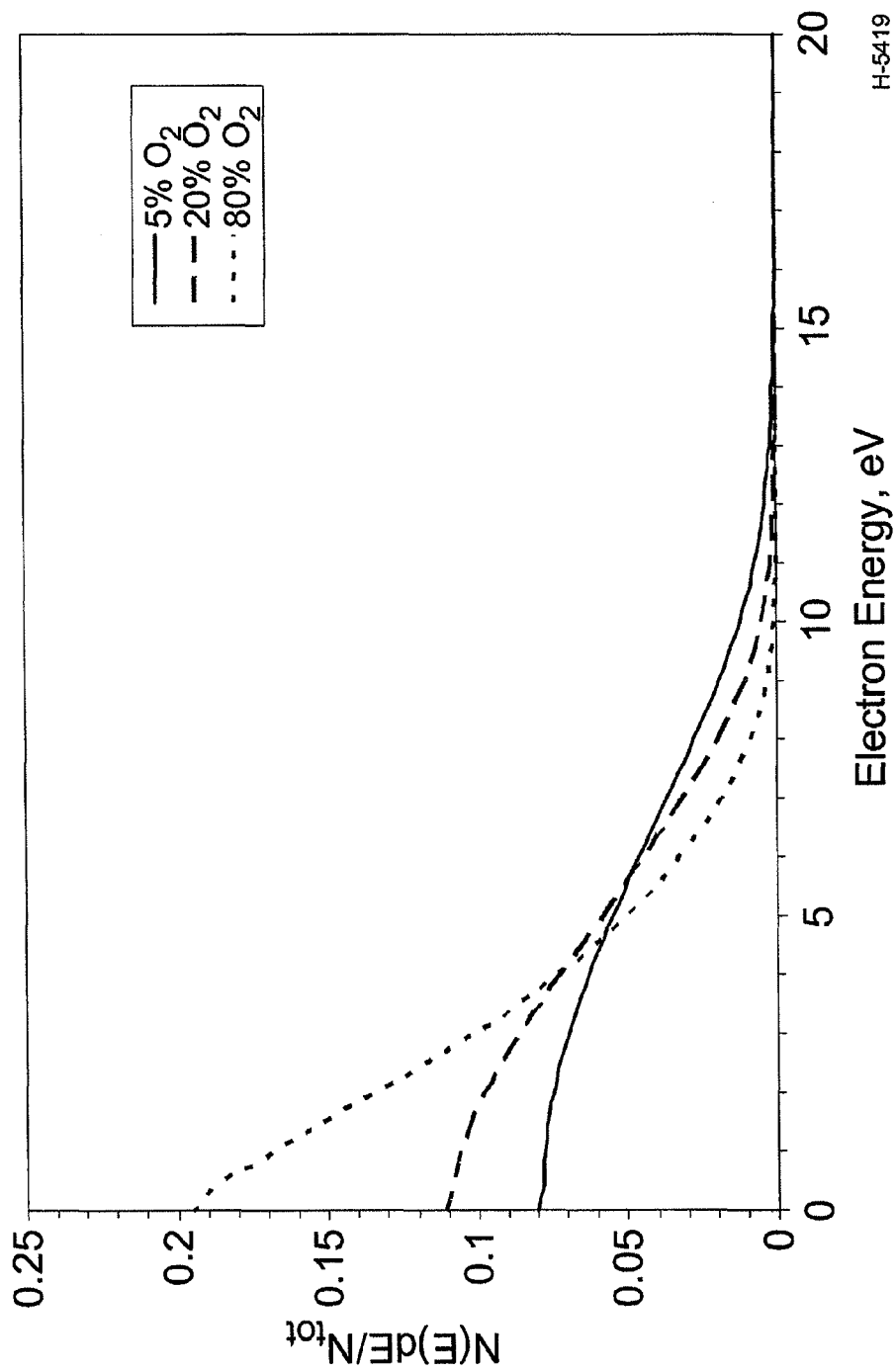
FIG. 8 is a graph of computed electron energy distributions functions for a discharge-excited $O_2$/Ar mixture with varying $O_2$ mole fractions when E/N is equal to 50 Td.

FIG. 8 is a graph of computed electron energy distributions functions for a discharge-excited $O_2/Ar$ mixture with varying $O_2$ mole fractions when E/N is equal to 50 Td. With a decreasing $O_2$, the fraction of high-energy electrons increases, signifying increasing electron "temperature." Increases in the high-energy component of the electron energy distribution result in larger overlap integrals that have key electronic excitation cross sections.

Figure 9:
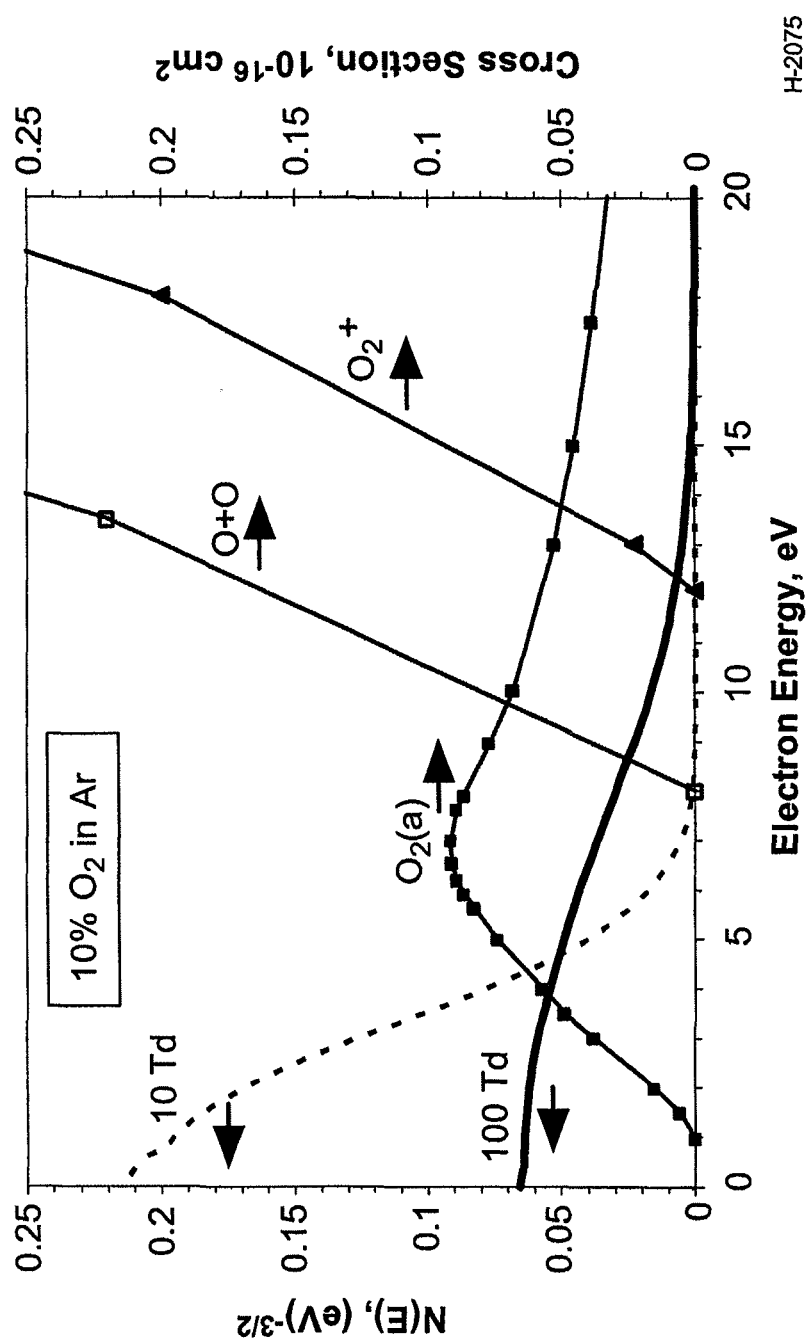
FIG. 9 is a graph of an overlap of electron energy distributions that shows electron impact excitation cross sections for $O_2(a)$ excitation, $O_2$ dissociation, and $O_2$ ionization, when E/N is equal to 10 Td and 100 Td in 10% $O_2$/Ar.

FIG. 9 is a graph of the overlap of electron energy distributions that shows electron impact excitation cross sections for $O_2(a)$ excitation, $O_2$ dissociation, and $O_2$ ionization, when E/N is equal to 10 Td and 100 Td in 10% $O_2/Ar$. The 10 Td distribution provides power-efficient $O_2(a)$ excitation, in that very little power is expended on $O_2$ dissociation. However, the poor overlap with the ionization cross section results in a very low ionization rate and consequently low electron number density. The 100 Td distribution gives greater overlap with both the $O_2(a)$ excitation cross section and the $O_2$ ionization cross section, but at the expense of increased $O_2$ dissociation. The $O_2(a)$ excitation rate is given by the product $k_{exc}[e^-][O_2]$. Both $k_{exc}$ and $[e^-]$, and hence the yield of $O_2(a)$, can be considerably enhanced through use of larger E/N and/or lower $O_2$ mole fraction to achieve more energetic electron energy distributions. This illustrates the basic conundrum of $O_2(a)$ generation for EOIL: high power utilization efficiency is optimized by "cold" electron energy distributions (e.g. lower E/N), however high $O_2(a)$ production rate and therefore high $O_2(a)$ yield require more energetic distributions (e.g. higher E/N).

Figure 10:
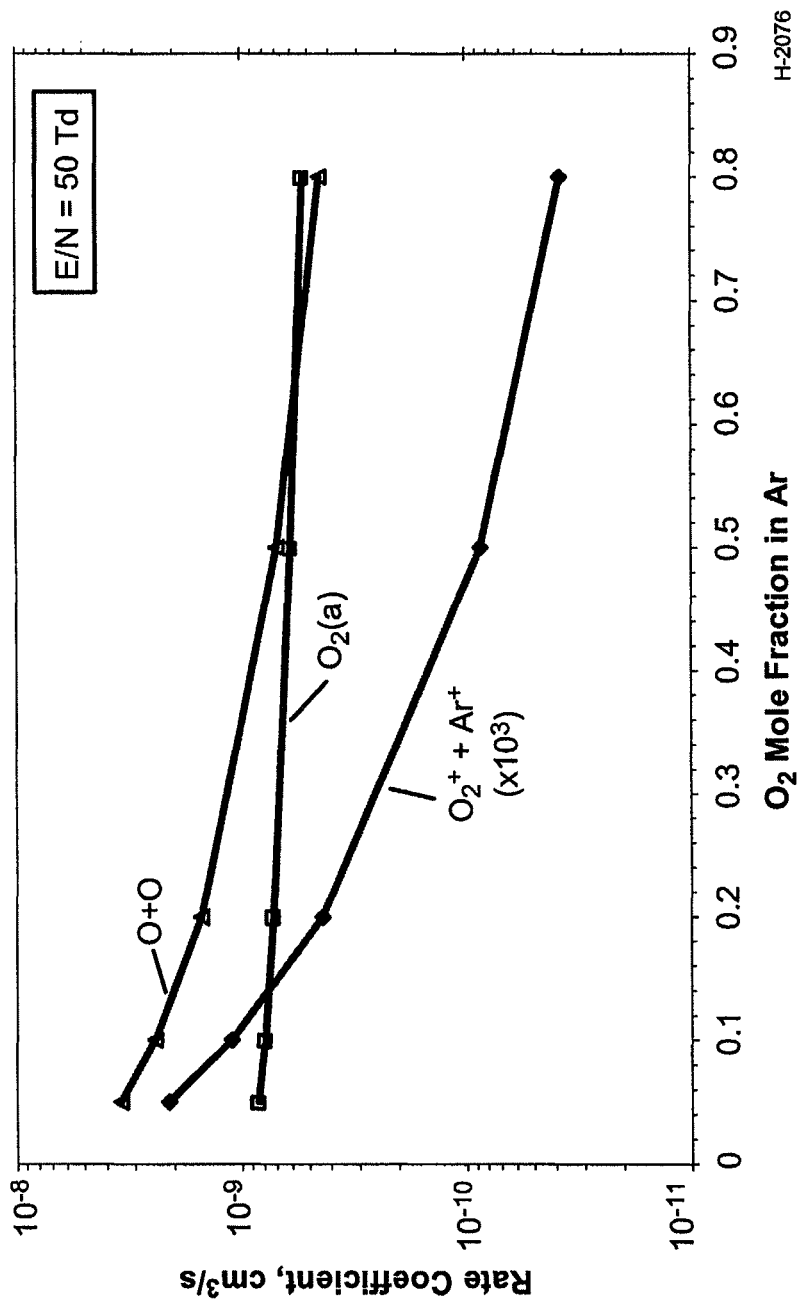
FIG. 10 is a graph of the effect of variations in $O_2$ mole fraction on computed electron-impact rate coefficients for $O_2(a)$ excitation, $O_2$, and total ionization of discharge-excited $O_2$/Ar mixtures when E/N is equal to 50 Td.

FIG. 10 is a graph of the effect of variations in $O_2$ mole fraction on computed electron-impact rate coefficients for $O_2(a)$ excitation, $O_2$ disassociation, and total ionization of discharge-excited $O_2/Ar$ mixtures when E/N is equal to 50 Td. The excitation rate coefficient increases modestly with decreasing $O_2$ fraction. However, the $O_2$ ionization rate coefficient increases by almost two orders of magnitude from 80% $O_2$ to 5% $O_2$, signifying a large increase in the ion pair production rate and in the electron number density. The Ar ionization rate coefficient, which has a higher energy threshold, is even more sensitive to the $O_2$ fraction, and becomes an important contributor for the dilute mixtures.

An approximation to the zeroth order for the $O_2(a)$ production is:

$$[O_2(a)] \approx k_{exc}[e^-][O_2]\tau \qquad \text{EQN. 15}$$

where $\tau$ denotes the gas residence time in the discharge. The gas residence time for the low-power Evenson-type resonant cavity embodiment in the discharge is approximately 0.2 ms. The gas residence time corresponds to an effective $O_2(a)$ "loss" rate that is faster than collision losses within the discharge for anticipated electron number densities. The $O_2(a)$ yield is then simply approximately $k_{exc}[e^-]\tau$, and is thus dependent on the electron energy distribution via E/N and $O_2$ fraction. The gas residence time in the 1 kW coaxial discharge can be longer (e.g., approximately 4.0 ms).

In one embodiment, singlet oxygen metastables can be generated at high power (e.g., 1 kW to 2 kW) and high throughput. Gas mixtures of $O_2$/He and $O_2/I_2$/He can be injected into the plenum via a tangential jet to give a swirl flow confined near the axis of the cavity. The discharge effluent can expand at about Mach 2 through the nozzle into the supersonic flow region. The nozzle can be a water-cooled boron nitride nozzle. The I* produced can be sufficient to produce lasing in the optical resonator. The $O_2$/He mixture can be about 2-50% $O_2$ in He, the plenum pressures can be about 35-50 torr, the total discharge gas flow rate can be about 35 to 42 mmole/s, the discharge power can be about 1 kW, and the discharge temperature can be about 1000 K. In some embodiments, more dilute $O_2$/He mixtures can be used with a 400 cfm (air) pumping speed that can limit the supersonic expansion conditions to M=1.8, T=500 K, and P=7.5 torr. The limited supersonic expansion conditions can be due to relatively low pumping capacity for helium. In some embodiments, a MIDJet singlet oxygen metastable driven EOIL is capable of operation up to 5 kW discharge power, with proportionately higher gas flow rates to optimize $O_2(a)$ production. In one embodiment, the MIDJet singlet oxygen metastable driven EOIL can operate with a 1 kW discharge power and an E/N approximately equal to 30-43 Td. For a low-power subsonic reactor with a supply power of 70-100 W and a microwave cavity pressure of 1-3 torr, the yield of $O_2(a)$ can increase as the mole fraction of $O_2$ decreases. For example, with a ~5% $O_2$/Ar mixture, 20-25% $O_2(a)$ yields can be obtained. These yields can produce positive I*-I gain at room temperature. A positive gain at 350 K can be achieved when $NO_2$ is used to suppress atomic oxygen effects.

Figure 11:
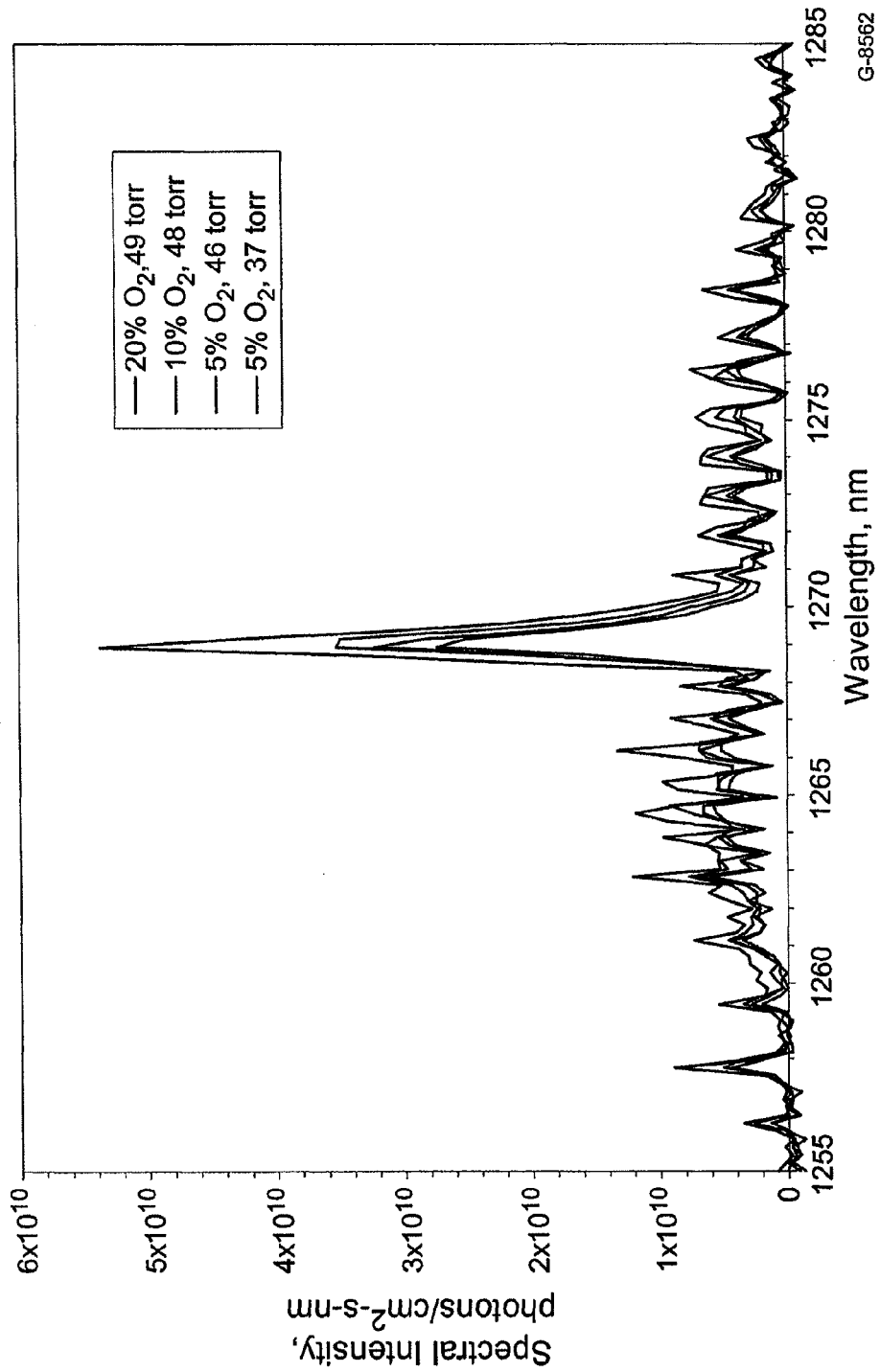
FIG. 11 is a graph of $O_2(a)$ emission spectra with a 1 kW discharge power, various $O_2$ mole fractions, and various plenum pressures.
Figure 12:
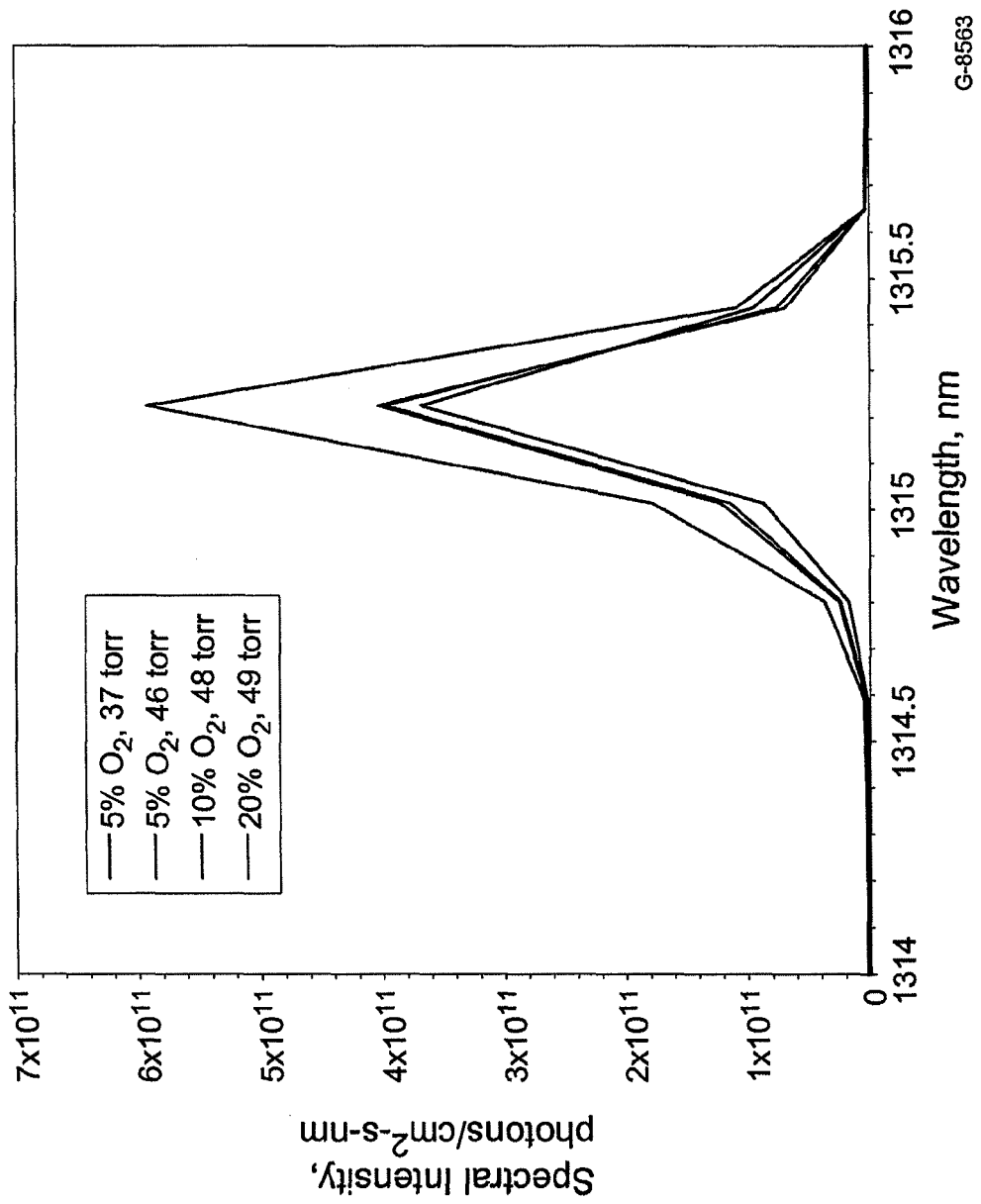
FIG. 12 is a graph of I* emission spectra with a 1 kW discharge power, various $O_2$ mole fractions, various plenum pressures, and an $I_2$ flow rate equal to 0.18 mole/s.
Figure 13:
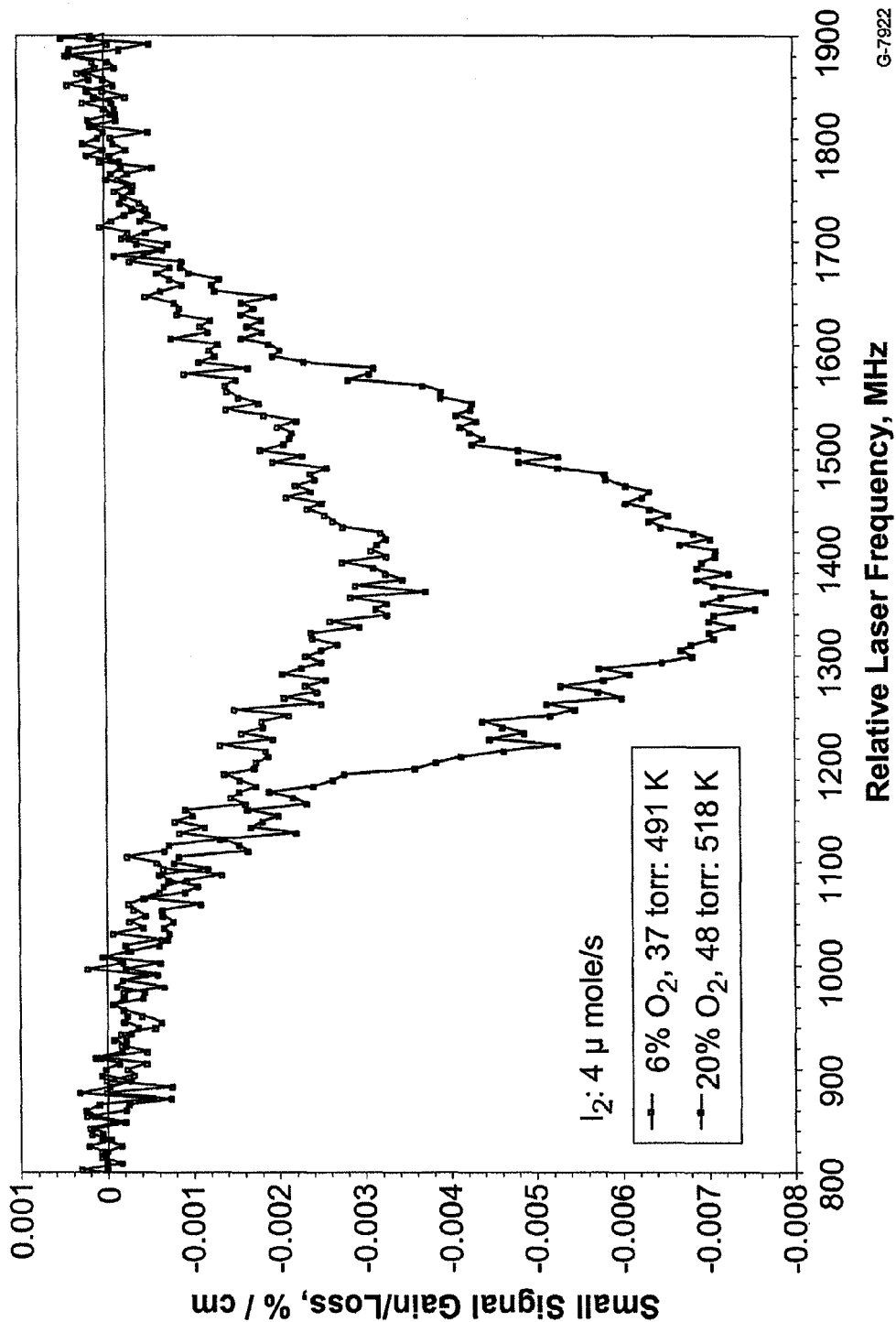
FIG. 13 is a graph of atomic iodine absorption with a 1 kW discharge power, various $O_2$ mole fractions, and various plenum pressures.

In one embodiment, a MIDJet singlet oxygen metastable driven EOIL was driven with a 1 kW input power. The $O_2(a)$ yield results were similar to those for the low-power subsonic reactor discussed above. The $O_2(a)$ and I* emission spectra from the supersonic flow for different discharge conditions are shown in FIGS. 11 and 12. As the $O_2$ mole fraction was decreased by a factor of 4, the $O_2(a)$ emission intensity decreased by less than a factor of 2, signifying an increased $O_2(a)$ yield. In addition, the I* emission intensity, proportional to [I*], was higher for the lower $O_2$ mole fractions, signifying more I* excitation due to a larger $O_2(a)$ yield. Small-signal gain measurements taken on the I* to I transition by a tunable diode laser diagnostic are shown in FIG. 13. The data shows net absorption occurred at approximately 500 K. The flow expansion and temperature are limited by low pumping speed for He, however the absorption decreased as the $O_2(a)$ yield increased. This signified transfer of population from I to I*, commensurate with the behavior of the I* emission.

Figure 14:
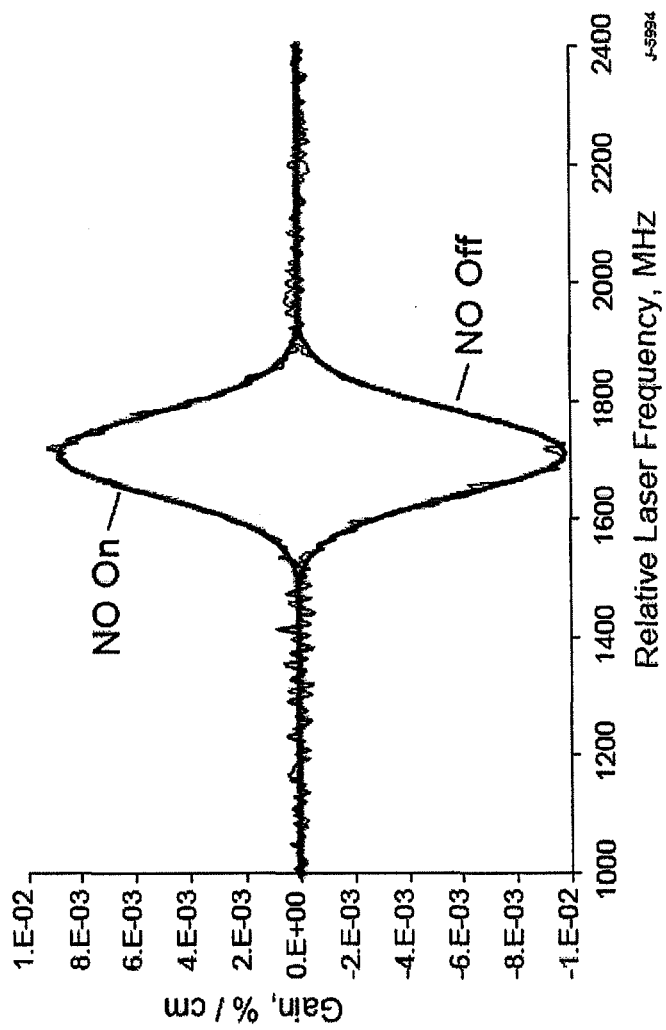
FIG. 14 is a graph of gain measurement at 1 kW discharge power.

FIG. 14 shows gain measurement at 1 kW discharge power. The conditions for these measurements were: 5% O2/He at 47 mmole/s with ~0.4 mmole/s NO added through the discharge, 33 ton in the MIDJet discharge, and 24 torr in the 2-D subsonic flow. The supersonic flow was probed by a diode laser 4.35 cm downstream of the nozzle throat. The diode laser transmission scans are shown for NO off (absorption) and on (gain), for an iodine source temperature of 37 C (~5 µmole/s, [I2]o~7×1013 cm-3 in the subsonic flow). The scans have been corrected for etalon baselines, and are fit to Gaussian curves representing Doppler broadening. The line widths correspond to temperatures of ~135 K. Measurements further upstream, ~2 cm downstream of the throat, showed slightly smaller positive gain. 16% $O_2$ in He also showed positive gain. The iodine source temperature can be increased to attain $I_2$ flow rates up to 33 µmole/s and peak gains up to 0.025%/cm, for a total flow rate of 82 mmole/s and 70 torr in the discharge. Without NO being introduced into the discharge small positive gains are expected (few ×10-3%/cm) for [I2]o less than about $1 \times 10^{14}$ cm$^{-3}$, and increasing absorption above that level. The addition of NO through the discharge reduces the O+I* quenching effect, as well as the efficacy of I* loss processes, resulting in positive gain.

The NO flow rate can be optimized to produce maximum gain for a given I2 flow rate. Addition of excessive NO can cause O removal, such that O is not in sufficient excess over $I_2$ to give adequate $I_2$ dissociation. The NO flow rate can decrease with increasing $I_2$ flow rate: at higher $[I_2]o$, the O concentration at the $I_2$ inlet must be higher, and the O+I* quenching loss is more severe because of both the higher [O] and the increasing $O_2(a)$ loss with increasing [I]. In some embodiments, the gain can be optimized at about 0.4 to 0.5 mmole/s of NO, and can decreases at higher NO flow rates.

Figure 15:
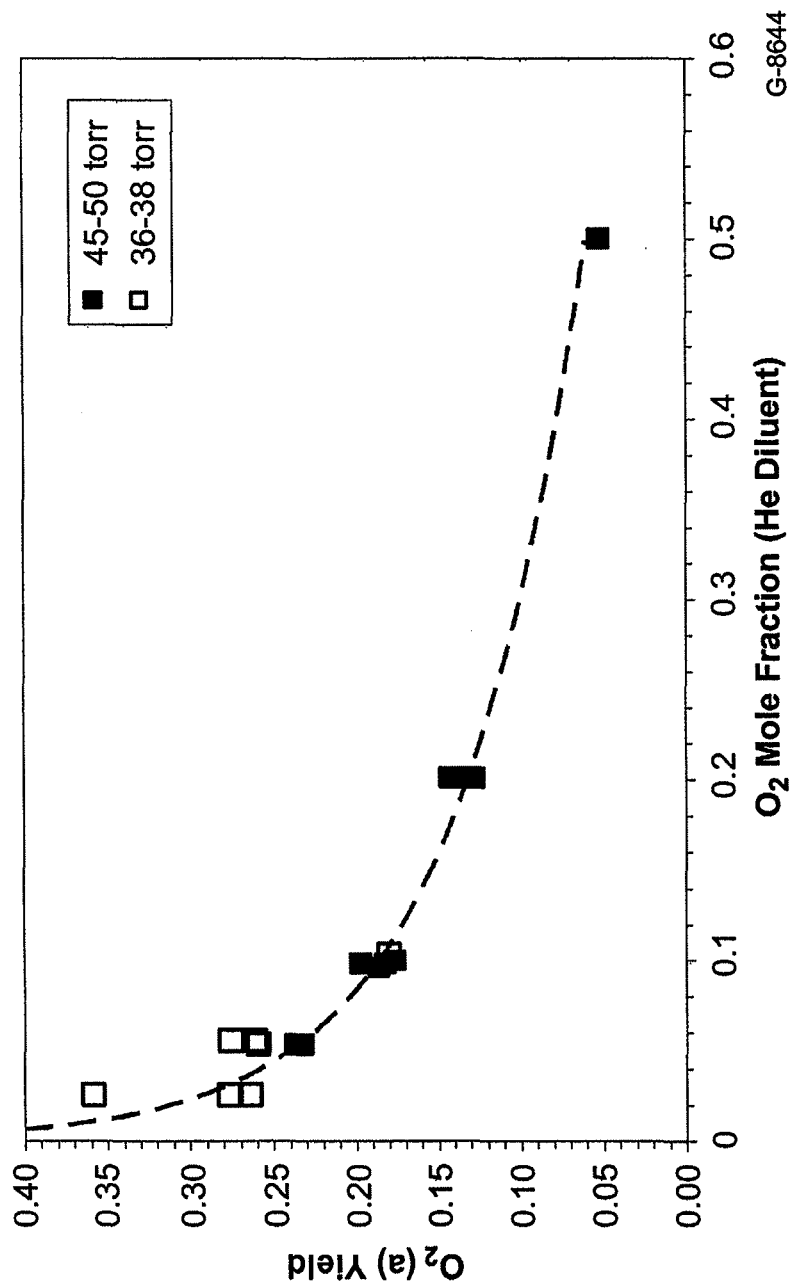
FIG. 15 is a graph of $O_2(a)$ yield generated by the MIDJet discharge with a 1 kW power and various plenum pressures.

FIG. 15 is a graph of $O_2(a)$ yield generated by the MIDJet discharge plenum with a 1 kW power source and various plenum pressures. Through integration of the $O_2(a)$ emission spectra and application of the Einstein coefficient for the (a→X) transition, $[O_2(a)]$ and $O_2(a)$ yields were determined. The observed $O_2(a)$ concentrations ranged from (0.7 to 3)×10$^{15}$ molecules/cm$^3$ for total $O_2$ concentrations of (0.3 to 5)×10$^{16}$ molecules/cm$^3$ in the 7.5 ton flow. These yields exceed 20% for $O_2$ mole fractions below 10%.

Figure 16:
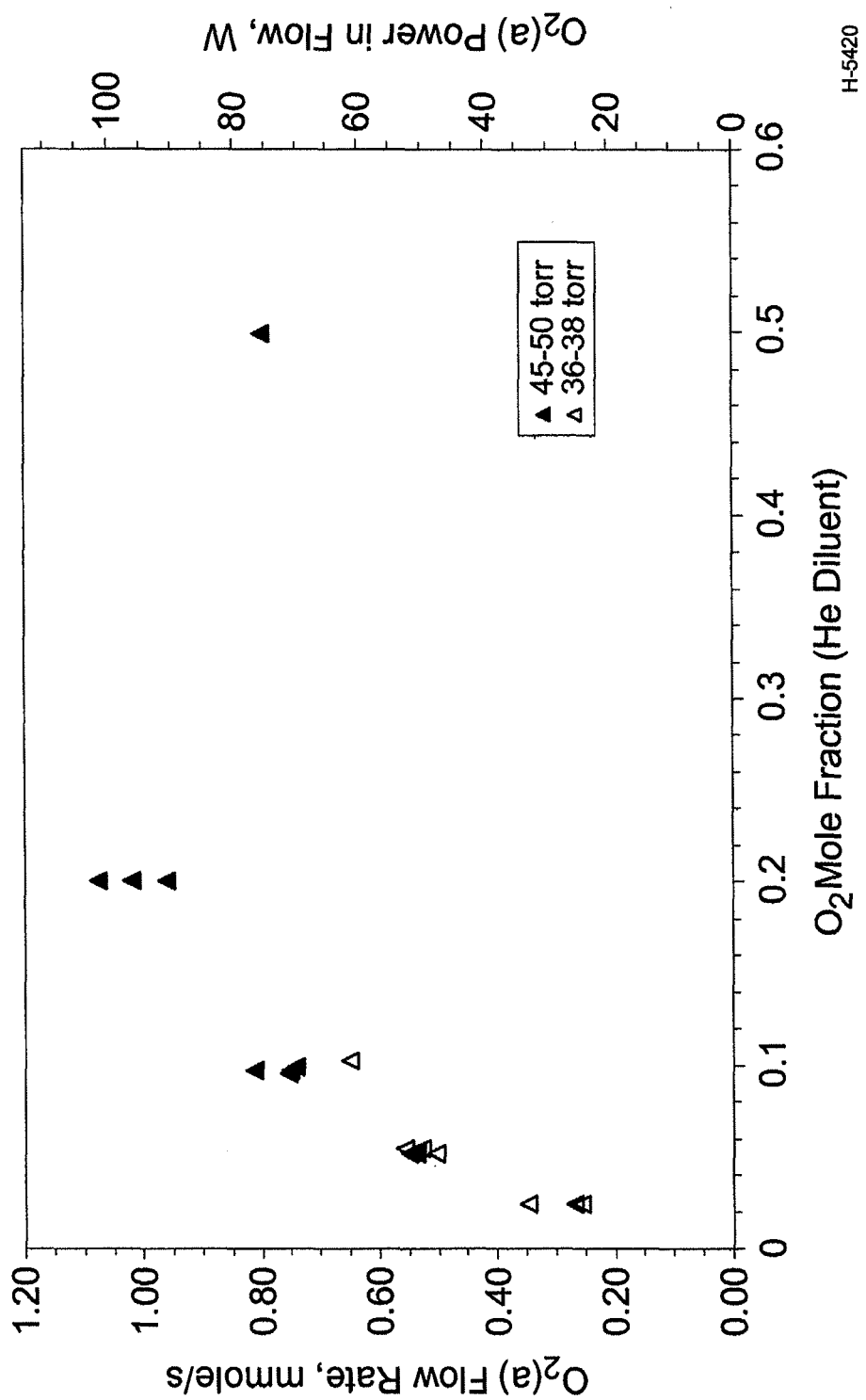
FIG. 16 is a graph of $O_2(a)$ flow rates for the MIDJet singlet oxygen metastable driven EOIL driven with a 1 kW.
Figure 17:
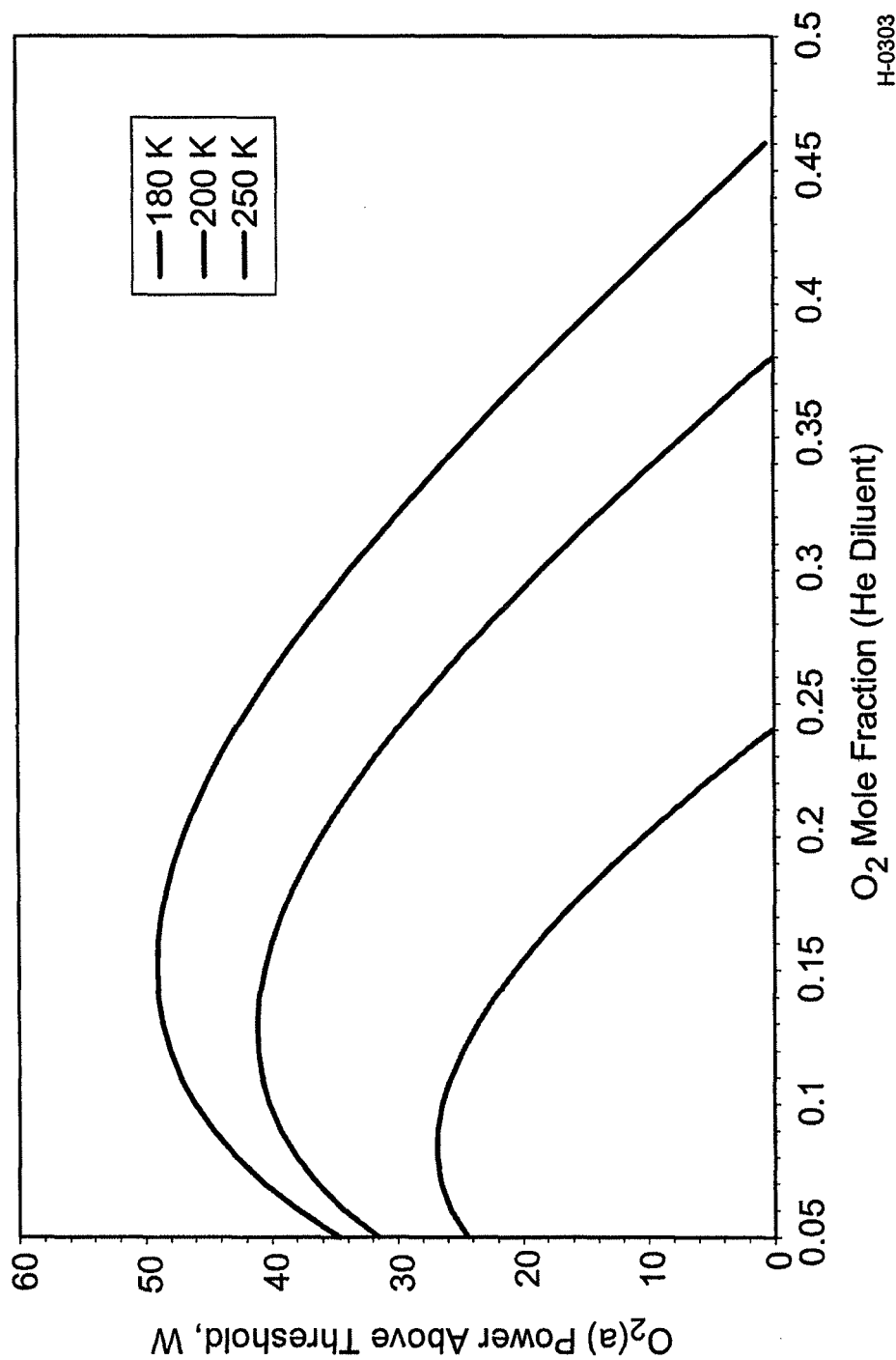
FIG. 17 is a graph of $O_2(a)$ power available in the flow for selected flow temperatures, corresponding to observed MIDJet $O_2(a)$ yields at 1 kW discharge power and 45-50 torr microwave driven discharge device pressure.

FIG. 16 is a graph of $O_2(a)$ flow rates for the MIDJet singlet oxygen metastable driven EOIL driven with a 1 kW. The total $O_2(a)$ power in the flow is indicated on the right hand axis. The $O_2(a)$ flow rate peaked out at approximately 1 mmole/s, corresponding to a peak total $O_2(a)$ power of approximately 100 W and a peak power efficiency of approximately 10% for the generation of $O_2(a)$, at an $O_2$ mole fraction of 20%. Using EQN. 13 and a curve fit, the maximum power available for lasing was found, for multiple temperatures in the cavity as produced by supersonic expansion, 180K, 200K and 250K with 45-50 torr in the MIDJet discharge plenum. The results are shown in FIG. 17. The available $O_2(a)$ powers above the gain threshold were about 10 to 50 W with a maxima at $O_2$ mole fractions of 10-15%. The observed $O_2(a)$ yield is comparable to those used to demonstrate positive gain near room temperature and is larger than those used in previous EOIL laser demonstrations in supersonic flow. Furthermore, tens of watts of laser power can be extracted from this 1 kW supply power discharge system with sufficient pumping capacity to adequately cool the flow, e.g., a pumping speed of at least 2000 cfm (air).

For discharge operation at 1 kW and higher powers, heat deposition and the temperature of the plenum gas can be significant issues. Physics dictates that the temperature rise due to heat deposition from the applied discharge power scales as the ratio of the power to the molar (or mass) flow rate of the gas. If there were no active cooling of the MIDJet plenum, the temperature rise would be ~1275 K for 1 kW power. However, for the water-cooled nozzle system, $\Delta T$ was approximately 700 K. Nevertheless, this results in a plenum gas temperature of 1000 K, which necessitates a Mach number M>3 to reach T<250 K in the supersonic expansion. Therefore, a high-power FOIL system can be implemented with active cooling of the plenum gas, preferably to temperatures below ~800 K so that Mach 2-3 nozzles can be used.

While the invention has been particularly shown and described with reference to specific embodiments, it should be understood by those skilled in the art that various changes in form and detail may be made therein without departing from the spirit and scope of the technology as defined by the appended claims.

What is claimed:

1. A laser device comprising:
   an optical resonator;
   a microwave driven discharge device disposed relative to the optical resonator, the microwave driven discharge device operating at a discharge power and gas flow rate to produce a selected amount of energetic singlet oxygen metastables flowing in the direction of the optical resonator; and
   a source for a second gas disposed between the optical resonator and the microwave driven discharge device, the second gas reacting with the selected amount of energetic singlet oxygen metastables to form an excited species in an amount sufficient to support lasing of the excited species in the optical resonator.

2. The laser device of claim 1 wherein the microwave driven discharge device comprises:
   a microwave cavity;
   an injector directing a flow of ground state oxygen and a substantially inert gas to the microwave cavity; and
   a microwave power source supplying the discharge power directly to the microwave cavity to form a plasma discharge flowing through an output nozzle of the microwave cavity, the plasma discharge including the selected amount of energetic singlet oxygen metastables.

3. The laser device of claim 2 wherein the discharge power and the gas flow rate are selected to increase the selected amount of energetic singlet oxygen metastables while controlling electron temperature in the microwave cavity.

4. The laser device of claim 2 wherein the discharge power and the gas flow rate are selected to increase the selected amount of energetic singlet oxygen metastables while controlling gas temperature in the microwave cavity.

5. The laser device of claim 2 wherein the injector directs a flow NO with the ground state oxygen and the substantially inert gas to the microwave cavity.

6. The laser device of claim 2 wherein the microwave cavity is cooled with water.

7. The laser device of claim 1 further comprising a nozzle disposed between the optical resonator and the source, the nozzle effecting a supersonic expansion of the gas flow including the excited species into the optical resonator.

8. The laser device of claim 1 wherein the optical resonator is disposed in a subsonic flow region of the laser device.

9. The laser device of claim 1 wherein the microwave driven discharge device comprises a MIDJet generator.

10. The laser device of claim 2 wherein the microwave power source delivers about 1 kW to about 100 kW.

11. The laser device of claim 2 wherein pressure in the microwave cavity is less than 100 torr.

12. The laser device of claim 2 wherein the output nozzle diameter is less than 30 mm.

13. A method for providing laser output, comprising:
    directing a flow of ground state oxygen and a substantially inert gas into a microwave cavity to produce energetic singlet oxygen metastables;
    optimizing discharge power and gas flow rate to produce a selected amount of the energetic singlet oxygen metastables; and
    directing a flow of a third gas to react with the selected amount of the energetic singlet oxygen metastables to form an excited species in an amount sufficient to support lasing of the excited species in an optical resonator disposed relative to the microwave cavity.

14. The method of claim 13 further comprising controlling the discharge power and the gas flow rate to increase the selected amount of energetic singlet oxygen metastables while controlling electron temperature in the microwave cavity.

15. The method of claim 13 further comprising controlling the discharge power and the gas flow rate to increase the selected amount of energetic singlet oxygen metastables while controlling gas temperature in the microwave cavity.

16. The method of claim 13 further comprising injecting a flow NO with the ground state oxygen and the substantially inert gas to the microwave cavity.

17. The method of claim 13 further comprising disposing a nozzle between the optical resonator and the flow of the third gas, the nozzle effecting a supersonic expansion of the gas flow including the excited species into the optical resonator.

18. The method of claim 13 further comprising disposing the optical resonator in a subsonic flow region of the laser device.

19. The method of claim 13 further comprising cooling the microwave cavity with water.

20. The method of claim 13 further comprising operating at a discharge power of about 1 kW to about 100 kW.

21. An apparatus for providing laser output, comprising:
    means for directing a flow of ground state oxygen and a substantially inert gas into a microwave cavity to produce energetic singlet oxygen metastables;
    means for optimizing discharge power and gas flow rate to produce a selected amount of the energetic singlet oxygen metastables; and
    means for directing a flow of a third gas to react with the selected amount of the energetic singlet oxygen metastables to form an excited species in an amount sufficient to support lasing of the excited species in an optical resonator disposed relative to the microwave cavity.

* * * * *